US008423889B1

(12) United States Patent
Zagorie et al.

(10) Patent No.: US 8,423,889 B1
(45) Date of Patent: Apr. 16, 2013

(54) DEVICE SPECIFIC PRESENTATION CONTROL FOR ELECTRONIC BOOK READER DEVICES

(75) Inventors: Aviram Zagorie, Seattle, WA (US); Michael V. Rykov, Seattle, WA (US); Craig S. Griffin, Campbell, CA (US); John Lattyak, Los Gatos, CA (US)

(73) Assignee: Amazon Technologies, Inc., Reno, NV (US)

( * ) Notice: Subject to any disclaimer, the term of this patent is extended or adjusted under 35 U.S.C. 154(b) by 618 days.

(21) Appl. No.: 12/333,215

(22) Filed: Dec. 11, 2008

Related U.S. Application Data

(60) Provisional application No. 61/059,187, filed on Jun. 5, 2008.

(51) Int. Cl.
*G06F 17/27* (2006.01)

(52) U.S. Cl.
USPC .......................................................... 715/255

(58) Field of Classification Search ................... 715/255
See application file for complete search history.

(56) References Cited

U.S. PATENT DOCUMENTS

| | | | |
|---|---|---|---|
| 4,622,627 A | 11/1986 | Rodriguez et al. |
| 5,566,098 A | 10/1996 | Lucente et al. |
| 5,623,260 A | 4/1997 | Jones |
| 5,659,742 A | 8/1997 | Beattie et al. |
| 5,663,748 A | 9/1997 | Huffman et al. |
| 5,710,922 A | 1/1998 | Alley et al. |
| 5,711,922 A | 1/1998 | O'Brien et al. |
| 5,742,905 A | 4/1998 | Pepe et al. |
| 5,761,485 A | 6/1998 | Munyan |
| 5,765,168 A | 6/1998 | Burrows |
| 5,813,017 A | 9/1998 | Morris |
| 5,845,278 A | 12/1998 | Kirsch et al. |
| 5,847,698 A | 12/1998 | Reavey et al. |
| 5,892,900 A | 4/1999 | Ginter et al. |
| 5,940,846 A | 8/1999 | Akiyama |
| 5,956,048 A | 9/1999 | Gaston |
| 5,960,411 A | 9/1999 | Hartman et al. |
| 5,973,681 A | 10/1999 | Tanigawa et al. |

(Continued)

FOREIGN PATENT DOCUMENTS

| | | |
|---|---|---|
| CN | 101120358 A | 2/2008 |
| EP | 1842150 A2 | 10/2007 |

(Continued)

OTHER PUBLICATIONS

Beigbeder, et al., "An Information Retrieval Model Using the Fuzzy Proximity Degree of Term Occurences", 2005 ACM Symposium on Applied Computing, pp. 1018-1022.

(Continued)

*Primary Examiner* — Laurie Ries
*Assistant Examiner* — Tionna Smith
(74) *Attorney, Agent, or Firm* — Lowenstein Sandler LLP

(57) ABSTRACT

Techniques for delivering digital content to be rendered on electronic book ("eBook") reader devices are described. The eBook reader devices have different technical features, particularly in terms of display capabilities and navigational capabilities. For instance, eBook reader devices may have differing screen sizes, use different types of display technologies, and have varying browser functionality. The techniques described in this disclosure provide for ways to efficiently and effectively deliver content to various types of reader devices, and to control presentation of that content on individual devices.

27 Claims, 7 Drawing Sheets

U.S. PATENT DOCUMENTS

| | | | |
|---|---|---|---|
| 6,018,575 | A | 1/2000 | Gross et al. |
| 6,034,839 | A | 3/2000 | Hamming |
| 6,037,954 | A | 3/2000 | McMahon |
| 6,041,335 | A | 3/2000 | Merritt et al. |
| 6,047,189 | A | 4/2000 | Yun et al. |
| 6,049,796 | A | 4/2000 | Siitonen et al. |
| 6,064,980 | A | 5/2000 | Jacobi et al. |
| 6,073,148 | A | 6/2000 | Rowe et al. |
| 6,148,340 | A | 11/2000 | Bittinger et al. |
| 6,233,318 | B1 | 5/2001 | Picard et al. |
| 6,313,828 | B1 | 11/2001 | Chombo |
| 6,331,867 | B1 | 12/2001 | Eberhard et al. |
| 6,351,750 | B1 | 2/2002 | Duga et al. |
| 6,385,596 | B1 | 5/2002 | Wiser et al. |
| 6,401,239 | B1 | 6/2002 | Miron |
| 6,449,627 | B1 | 9/2002 | Baer et al. |
| 6,466,951 | B1 | 10/2002 | Birkler et al. |
| 6,496,803 | B1 | 12/2002 | Seet et al. |
| 6,529,920 | B1 | 3/2003 | Arons et al. |
| 6,560,699 | B1 | 5/2003 | Konkle |
| 6,642,947 | B2 | 11/2003 | Feierbach |
| 6,658,623 | B1 | 12/2003 | Schilit et al. |
| 6,687,878 | B1 | 2/2004 | Eintracht et al. |
| 6,704,733 | B2 | 3/2004 | Clark et al. |
| 6,721,869 | B1 | 4/2004 | Senthil |
| 6,724,403 | B1 | 4/2004 | Santoro et al. |
| 6,725,227 | B1 | 4/2004 | Li |
| 6,735,583 | B1 | 5/2004 | Bjarnestam et al. |
| 6,744,891 | B1 | 6/2004 | Allen |
| 6,847,966 | B1 | 1/2005 | Sommer et al. |
| 6,904,449 | B1 | 6/2005 | Quinones |
| 6,912,398 | B1 | 6/2005 | Domnitz |
| 6,933,928 | B1 | 8/2005 | Lilienthal |
| 6,938,076 | B2 | 8/2005 | Meyer et al. |
| 6,985,932 | B1 | 1/2006 | Glaser et al. |
| 6,999,565 | B1 | 2/2006 | Delaney et al. |
| 7,007,015 | B1 | 2/2006 | Nayak |
| 7,009,596 | B2 | 3/2006 | Seet et al. |
| 7,010,500 | B2 | 3/2006 | Aarnio |
| 7,020,654 | B1 | 3/2006 | Najmi |
| 7,057,591 | B1 | 6/2006 | Hautanen et al. |
| 7,062,707 | B1 | 6/2006 | Knauft et al. |
| 7,092,116 | B2 | 8/2006 | Calaway |
| 7,103,848 | B2 | 9/2006 | Barsness et al. |
| 7,107,533 | B2 | 9/2006 | Duncan et al. |
| 7,130,841 | B1 | 10/2006 | Goel et al. |
| 7,133,506 | B1 | 11/2006 | Smith |
| 7,135,932 | B2 | 11/2006 | Quadir et al. |
| 7,165,217 | B1 | 1/2007 | Kondo |
| 7,188,085 | B2 | 3/2007 | Pelletier |
| 7,209,888 | B2 | 4/2007 | Frid-Nielsen et al. |
| 7,249,060 | B2 | 7/2007 | Ling |
| 7,257,577 | B2 | 8/2007 | Fagin et al. |
| 7,287,068 | B1 | 10/2007 | Eriksson et al. |
| 7,298,851 | B1 | 11/2007 | Hendricks et al. |
| 7,304,635 | B2 | 12/2007 | Seet et al. |
| 7,310,629 | B1 | 12/2007 | Mendelson et al. |
| 7,313,759 | B2 * | 12/2007 | Sinisi ............... 715/203 |
| 7,350,704 | B2 | 4/2008 | Barsness et al. |
| 7,355,591 | B2 | 4/2008 | Sugimoto |
| 7,386,480 | B2 | 6/2008 | Sarig |
| 7,398,244 | B1 | 7/2008 | Keith |
| 7,401,286 | B1 | 7/2008 | Hendricks et al. |
| 7,454,238 | B2 | 11/2008 | Vinayak et al. |
| 7,509,270 | B1 | 3/2009 | Hendricks et al. |
| 7,533,152 | B2 | 5/2009 | Stark et al. |
| 7,562,032 | B2 | 7/2009 | Abbosh et al. |
| 7,631,013 | B2 | 12/2009 | Parsons et al. |
| 7,634,429 | B2 | 12/2009 | Narin et al. |
| 7,656,127 | B1 | 2/2010 | Shutt et al. |
| 7,657,459 | B2 | 2/2010 | Anderson et al. |
| 7,680,849 | B2 | 3/2010 | Heller et al. |
| 7,788,369 | B2 | 8/2010 | McAllen et al. |
| 7,835,989 | B1 | 11/2010 | Hendricks et al. |
| 7,865,567 | B1 | 1/2011 | Hendricks et al. |
| 2001/0007980 | A1 | 7/2001 | Ishibashi et al. |
| 2001/0027478 | A1 | 10/2001 | Meier et al. |
| 2001/0037328 | A1 | 11/2001 | Pustejovsky et al. |
| 2001/0049623 | A1 | 12/2001 | Aggarwal et al. |
| 2001/0053975 | A1 | 12/2001 | Kurihara |
| 2002/0010707 | A1 | 1/2002 | Chang et al. |
| 2002/0010759 | A1 | 1/2002 | Hitson et al. |
| 2002/0012134 | A1 | 1/2002 | Calaway |
| 2002/0035697 | A1 | 3/2002 | McCurdy et al. |
| 2002/0054059 | A1 | 5/2002 | Schneiderman |
| 2002/0069222 | A1 | 6/2002 | McNeely |
| 2002/0069312 | A1 | 6/2002 | Jones |
| 2002/0090934 | A1 | 7/2002 | Mitchelmore |
| 2002/0092031 | A1 | 7/2002 | Dudkiewicz et al. |
| 2002/0101447 | A1 | 8/2002 | Carro |
| 2002/0103809 | A1 | 8/2002 | Starzl et al. |
| 2002/0120635 | A1 | 8/2002 | Joao |
| 2002/0123336 | A1 | 9/2002 | Kamada |
| 2002/0129012 | A1 | 9/2002 | Green |
| 2002/0138291 | A1 | 9/2002 | Vaidyanathan et al. |
| 2002/0143822 | A1 * | 10/2002 | Brid et al. ............... 707/522 |
| 2002/0147724 | A1 | 10/2002 | Fries et al. |
| 2002/0184319 | A1 | 12/2002 | Willner et al. |
| 2002/0194474 | A1 | 12/2002 | Natsuno et al. |
| 2003/0018720 | A1 | 1/2003 | Chang et al. |
| 2003/0028395 | A1 | 2/2003 | Rodgers et al. |
| 2003/0040970 | A1 | 2/2003 | Miller |
| 2003/0046233 | A1 | 3/2003 | Ara et al. |
| 2003/0052928 | A1 | 3/2003 | Williams |
| 2003/0058265 | A1 | 3/2003 | Robinson et al. |
| 2003/0065642 | A1 | 4/2003 | Zee |
| 2003/0069812 | A1 | 4/2003 | Yuen et al. |
| 2003/0093312 | A1 | 5/2003 | Ukita et al. |
| 2003/0093382 | A1 | 5/2003 | Himeno et al. |
| 2003/0097354 | A1 | 5/2003 | Finlay et al. |
| 2003/0105679 | A1 | 6/2003 | Krishnan et al. |
| 2003/0110503 | A1 | 6/2003 | Perkes |
| 2003/0129963 | A1 | 7/2003 | Nurcahya |
| 2003/0135495 | A1 | 7/2003 | Vagnozzi |
| 2003/0152894 | A1 | 8/2003 | Townshend |
| 2003/0163399 | A1 | 8/2003 | Harper et al. |
| 2003/0164844 | A1 | 9/2003 | Kravitz et al. |
| 2003/0182551 | A1 | 9/2003 | Frantz et al. |
| 2003/0190145 | A1 | 10/2003 | Copperman et al. |
| 2003/0191737 | A1 | 10/2003 | Steele et al. |
| 2003/0204496 | A1 | 10/2003 | Ray et al. |
| 2003/0212613 | A1 | 11/2003 | Sarig |
| 2004/0003398 | A1 | 1/2004 | Donian et al. |
| 2004/0015467 | A1 | 1/2004 | Fano |
| 2004/0030686 | A1 | 2/2004 | Cardno et al. |
| 2004/0044723 | A1 | 3/2004 | Bell et al. |
| 2004/0054499 | A1 | 3/2004 | Starzyk et al. |
| 2004/0098350 | A1 | 5/2004 | Labrou et al. |
| 2004/0117189 | A1 | 6/2004 | Bennett |
| 2004/0139400 | A1 | 7/2004 | Allam et al. |
| 2004/0167822 | A1 | 8/2004 | Chasen et al. |
| 2004/0201633 | A1 | 10/2004 | Barsness et al. |
| 2004/0205457 | A1 | 10/2004 | Bent et al. |
| 2004/0212941 | A1 | 10/2004 | Haas et al. |
| 2004/0237033 | A1 | 11/2004 | Woolf et al. |
| 2004/0267552 | A1 | 12/2004 | Gilliam et al. |
| 2004/0268253 | A1 | 12/2004 | DeMello et al. |
| 2005/0021464 | A1 | 1/2005 | Lindauer et al. |
| 2005/0022113 | A1 | 1/2005 | Hanlon |
| 2005/0044148 | A1 | 2/2005 | Son et al. |
| 2005/0044224 | A1 | 2/2005 | Jun et al. |
| 2005/0066219 | A1 | 3/2005 | Hoffman et al. |
| 2005/0069225 | A1 | 3/2005 | Schneider et al. |
| 2005/0088410 | A1 | 4/2005 | Chaudhri |
| 2005/0102618 | A1 * | 5/2005 | Naito ............... 715/526 |
| 2005/0125222 | A1 | 6/2005 | Brown et al. |
| 2005/0138007 | A1 | 6/2005 | Amitay |
| 2005/0138428 | A1 | 6/2005 | McAllen et al. |
| 2005/0144895 | A1 | 7/2005 | Grimes et al. |
| 2005/0176438 | A1 | 8/2005 | Li |
| 2005/0193330 | A1 | 9/2005 | Peters |
| 2005/0195975 | A1 | 9/2005 | Kawakita |
| 2005/0198070 | A1 | 9/2005 | Lowry |
| 2005/0222977 | A1 | 10/2005 | Zhou et al. |
| 2005/0250439 | A1 | 11/2005 | Leslie |
| 2005/0256822 | A1 | 11/2005 | Hollingsworth |
| 2006/0004840 | A1 | 1/2006 | Senda |

| | | | |
|---|---|---|---|
| 2006/0020469 A1 | 1/2006 | Rast | |
| 2006/0031316 A1 | 2/2006 | Forstadius | |
| 2006/0048184 A1 | 3/2006 | Poslinski et al. | |
| 2006/0057960 A1 | 3/2006 | Tran | |
| 2006/0061595 A1 | 3/2006 | Goede et al. | |
| 2006/0071754 A1 | 4/2006 | Tofts et al. | |
| 2006/0075205 A1 | 4/2006 | Martin et al. | |
| 2006/0098900 A1 | 5/2006 | King et al. | |
| 2006/0129618 A1 | 6/2006 | Maier | |
| 2006/0143558 A1 | 6/2006 | Albornoz et al. | |
| 2006/0161635 A1 | 7/2006 | Lamkin et al. | |
| 2006/0175983 A1 | 8/2006 | Crouse et al. | |
| 2006/0179137 A1 | 8/2006 | Jennings, III et al. | |
| 2006/0190568 A1 | 8/2006 | Patterson | |
| 2006/0253441 A1 | 11/2006 | Nelson | |
| 2006/0256083 A1 | 11/2006 | Rosenberg | |
| 2006/0265518 A1 | 11/2006 | Owens et al. | |
| 2006/0281058 A1 | 12/2006 | Mangoaela | |
| 2007/0039023 A1 | 2/2007 | Kataoka | |
| 2007/0050346 A1 | 3/2007 | Goel et al. | |
| 2007/0061335 A1 | 3/2007 | Ramer et al. | |
| 2007/0079383 A1 | 4/2007 | Gopalakrishnan | |
| 2007/0094285 A1 | 4/2007 | Agichtein et al. | |
| 2007/0105536 A1 | 5/2007 | Tingo, Jr. | |
| 2007/0112817 A1 | 5/2007 | Danninger | |
| 2007/0118533 A1 | 5/2007 | Ramer et al. | |
| 2007/0136660 A1 | 6/2007 | Gurcan et al. | |
| 2007/0136679 A1 | 6/2007 | Yang | |
| 2007/0174545 A1 | 7/2007 | Okada et al. | |
| 2007/0185865 A1 | 8/2007 | Budzik et al. | |
| 2007/0189719 A1 | 8/2007 | Furumachi et al. | |
| 2007/0219983 A1 | 9/2007 | Fish | |
| 2007/0233562 A1 | 10/2007 | Lidwell et al. | |
| 2007/0233692 A1 | 10/2007 | Lisa et al. | |
| 2007/0240187 A1 | 10/2007 | Beach et al. | |
| 2007/0282809 A1 | 12/2007 | Hoeber et al. | |
| 2007/0283173 A1 | 12/2007 | Webb et al. | |
| 2007/0288853 A1 | 12/2007 | Neil | |
| 2008/0005097 A1 | 1/2008 | Kleewein et al. | |
| 2008/0031595 A1 | 2/2008 | Cho | |
| 2008/0040233 A1 | 2/2008 | Wildman et al. | |
| 2008/0082518 A1 | 4/2008 | Loftesness | |
| 2008/0082911 A1 | 4/2008 | Sorotokin et al. | |
| 2008/0089665 A1 | 4/2008 | Thambiratnam et al. | |
| 2008/0113614 A1 | 5/2008 | Rosenblatt | |
| 2008/0120280 A1 | 5/2008 | Iijima et al. | |
| 2008/0120308 A1* | 5/2008 | Martinez et al. | 707/100 |
| 2008/0133479 A1 | 6/2008 | Zelevinsky et al. | |
| 2008/0163039 A1 | 7/2008 | Ryan et al. | |
| 2008/0164304 A1 | 7/2008 | Narasimhan et al. | |
| 2008/0168073 A1 | 7/2008 | Siegel et al. | |
| 2008/0208833 A1 | 8/2008 | Basmov | |
| 2008/0243788 A1 | 10/2008 | Reztlaff, II et al. | |
| 2008/0243828 A1 | 10/2008 | Reztlaff, II et al. | |
| 2008/0293450 A1 | 11/2008 | Ryan et al. | |
| 2008/0294674 A1 | 11/2008 | Reztlaff, II et al. | |
| 2008/0295039 A1 | 11/2008 | Nguyen et al. | |
| 2009/0094324 A1* | 4/2009 | Le Chevalier | 709/203 |
| 2009/0228774 A1* | 9/2009 | Matheny et al. | 715/201 |
| 2010/0188327 A1 | 7/2010 | Frid et al. | |

FOREIGN PATENT DOCUMENTS

| | | |
|---|---|---|
| JP | 2002099739 A | 4/2002 |
| WO | WO9720274 | 6/1997 |
| WO | WO0045588 | 8/2000 |
| WO | WO0056055 A2 | 9/2000 |
| WO | WO0075840 A2 | 12/2000 |
| WO | WO0239206 | 5/2002 |
| WO | WO2004055647 A2 | 7/2004 |
| WO | WO2006078728 A2 | 7/2006 |

OTHER PUBLICATIONS

Biskup, et al, "Towards a Credential-Based Implementation of Compound Access Control Policies" SACMAT '04, Proceedings of the ninth ACM symposium on Access control models and technologies, Jun. 4, 2004, NY, retrieved from the internet <<http://portal.acm.org/citation.cfm?id=990036.990042>>, retrieved Nov. 9, 2010, pp. 1-10.

Breu, et al., "The Medoc Distributed Electronic Library: Accounting and Security Aspects", Electronic Publishing, New Models and Opportunities, Proceedings of an ICCC/IFIP Conference, Apr. 14, 1997, pp. 237-249.

Gladney, "Access Control for Large Collections", NY, vol. 15, No. 2, Apr. 1, 1997, pp. 154-194.

Henke, "Survey on Electronic Book Features", Open eBook Forum, online, Mar. 20, 2002, pp. 1-14, retrieved from the internet <<http://www.openebook.org/doc_library/surveys/IDPF_eBook_Features_2002.pdf>> retrieved Nov. 8, 2010.

Navarro, et al., "Modern Information Retrieval, Chapter 8: Indexing and Searching", Jan. 1, 1999, Modern Information Retrieval, ACM Press, New York, pp. 191-228.

Ziviani, "Modern Information Retrieval, Text Operations", Jan. 1, 1999, Modern Information Retrieval, ACM Press, NY, pp. 163-190.

Zobel, et al., "Inverted Files for Text Search Engines", ACM Computing Surveys, vol. 38, No. 2, Jul. 1, 2006, pp. 1-56, NY, NY.

U.S. Appl. No. 11/537,484, filed Sep. 29, 2006, Thomas Ryan, "Expedited Acquisition of a Digital Item Following a Sample Presentation of the Item."

U.S. Appl. No. 11/537,518, filed Sep. 29, 2006, John Lattyak, "Acquisition of an Item based on a Catalog Presentation of Items."

U.S. Appl. No. 11/693,685, filed Mar. 29, 2007, John Lattyak; John Kim; Steven Moy; Laurent An Minh Nguyen, "Relative Progress and Event Indicators."

U.S. Appl. No. 11/763,339, filed Jun. 14, 2007, David Isbister; Marshall Willilams; Nicholas Vaccaro, "Power Management Techniques for a User Device."

U.S. Appl. No. 11/763,357, filed Jun. 14, 2007, James Reztlaff II; John Lattyak, "Obtaining and Verifying Search Indices."

U.S. Appl. No. 11/763,363, filed Jun. 14, 2007, James Reztlaff II; Thomas Ryan, "Search Results Generation and Sorting."

U.S. Appl. No. 11/763,375, filed Jun. 14, 2007, John Lattyak, Girish Bansil Bajaj, Kevin R. Cheung, Thomas Fruchterman, Robert L. Goodwin, Kenneth P. Kiraly, Richard Moore, Subram Narasimhan, Thomas A. Ryan, Michael V. Rykov, Jon Saxton, James C. Slezak, Beryl Tomay, Aviram Zagorie, Gregg Elliott Zehr, "Delivery of Items for Consumption by a User Device."

U.S. Appl. No. 11/763,376, filed Jun. 14, 2007, Kenneth Kiraly; Thomas Ryan; Gregg Zehr; John Lattyak; Michael Rykov; Girish Bansilal Bajaj; James Slezak; Aviram Zagorie; Richard Moore; Kevin Cheung; Thomas Fruchterman; Robert Goodwin, "Notification of a User Device to Perform an Action."

U.S. Appl. No. 11/763,378, filed Jun. 14, 2007, John Lattyak; Thomas Ryan; Gregg Zehr; Kenneth Kiraly; Michael Rykov; Girish Bansilal Bajaj; James Slezak; Aviram Zagorie; Richard Moore; Kevin Cheung; Thomas Fruchterman; Robert Goodwin; Xiaotian Guo, "Transfer of Instructions to a User Device."

U.S. Appl. No. 11/763,381, filed Jun. 14, 2007, Michael Rykov; Girish Bansilal Bajaj; James Slezak; Aviram Zagorie; Richard Moore; Kevin Cheung; Thomas Fruchterman; Robert Goodwin, "Selecting and Providing Items in a Media Consumption System."

U.S. Appl. No. 11/763,386, filed Jun. 14, 2007, Thomas Ryan; Gregg Zehr; Kenneth Kiraly; John Lattyak; Michael Rykov; Girish Bansilal Bajaj; James Slezak; Aviram Zagorie; Richard Moore; Kevin Cheung; Thomas Fruchterman; Robert Goodwin, "Handling of Subscription-Related Issues in a Media Consumption System."

U.S. Appl. No. 11/763,390, filed Jun. 14, 2007, Girish Bansilal Bajaj; Michael Rykov; James Slezak; Aviram Zagorie; Richard Moore; Kevin Cheung; Thomas Fruchterman; Robert Goodwin "Providing User-Supplied Items to a User Device."

U.S. Appl. No. 11/763,392, filed Jun. 14, 2007, Thomas Ryan; Gregg Zehr; Kenneth Kiraly; John Lattyak; Subram Narasimhan; Michael Rykov; Girish Bansilal Bajaj; James Slezak; Aviram Zagorie; Richard Moore; Kevin Cheung; Thomas Fruchterman; Robert Goodwin, "Administrative Tasks in a Media Consumption System ."

U.S. Appl. No. 11/763,393, filed Jun. 14, 2007, John Lattyak; Michael Rykov; Girish Bansilal Bajaj; James Slezak; Aviram Zagorie; Richard Moore; Kevin Cheung; Thomas Fruchterman; Robert Goodwin "Incremental Updates of Items ."

U.S. Appl. No. 11/763,395, filed Jun. 14, 2007, Thomas Ryan; Gregg Zehr; Kenneth Kiraly; John Lattyak; Michael Rykov; Girish Bansilal Bajaj; James Slezak; Aviram Zagorie; Richard Moore; Kevin Cheung; Thomas Fruchterman; Robert Goodwin; James Reztlaff II, "Providing Supplemental Information Based on Hints in a Media Consumption System."

U.S. Appl. No. 11/963,618, filed Dec. 21, 2007, Michael Rykov; Laurent An Minh Nguyen; Steven Moy, "Dissemination of Periodical Samples."

U.S. Appl. No. 12/351,629, filed Jan. 9, 2009, John Johnston; Weiping Dou; Steven Chase, "Antenna Placement on Portable Device."

U.S. Appl. No. 12/351,663, filed Jan. 9, 2009, Chris Li; Steven Chase, "Surface Mount Clip for Routing and Grounding Cables."

U.S. Appl. No. 12/360,089, filed Jan. 26, 2009, Thomas Dimson, Janna Hamaker, Eugene Kalenkovich, Tom Killalea, "Aggregation of Highlights."

U.S. Appl. No. 12/360,744, filed Jan. 27, 2009, Rajiv Kotesh Ghanta; Marcos Frid; Joseph J. Hebenstreit; John T. Kim, "Electronic Device With Haptic Feedback."

U.S. Appl. No. 12/366,941, filed Feb. 6, 2009, Scott Dixon; Eriel Thomas, "Bundled Digital Content."

U.S. Appl. No. 12/414,914, filed Mar. 31, 2009, Amit Agarwal; Zaur Kambarov; Tom Killalea, "Questions on Highlighted Passages."

U.S. Appl. No. 29/331,528, filed Jan. 27, 2009, Chris Green, "User Interface Cluster."

Cleveland, Jr. et al., "Questions and Answers about Biological Effects and Potential Hazards of Radiofrequency Electromagnetic Fields" OET Bulletin 56, Fourth Edition, Aug. 1999, 38 pages.

Cleveland, Jr., et al, "Evaluating Compliance with FCC Guidelines for Human Exposure to Radiofrequency Electromagnetic Fields" OET Bulletin 65, Edition 97-01, Aug. 1997, 84 pages.

Means, et al., "Evaluating Compliance with FCC Guidelines for Human Exposure to Radiofrequency Electromagnetic Fields", OET Bulletin 65 Edition 97-01, Jun. 2001, 57 pages.

"A Universally Unique IDentifier (UUID) URN Namespace", Jul. 2005, IETF, 32 pages. Retrieved on Apr. 21, 2010 at http://tools.ietf.org/pdf/rfc4122.pdf.

Bellwood, et al., "UDDI Version 2.04 API Specification UDDI Committee Specification, Jul. 19, 2002", Oasis, 95 pages. Retrieved on Apr. 21, 2010 via Wayback Machine at http://web.archive.org/web/20050314033213/www.oasis-open.org/committees/uddi-spec/doc/tcspecs.htm.

"Universal Unique Identifier", dated Dec. 16, 2002. The Open Group, 9 pages. Retrieved on Apr. 21, 2010 via Wayback Machine at http://web.archive.org/web/20021216070918/http://www.opengroup.org/onlinepubs/9629399/apdxa.htm.

"Web Services Architecture: W3C Working Group Note Feb. 11, 2004", Feb. 11, 2004, W3C, 100 pages. Retrieved on Apr. 21, 2010 via Wayback Machine at http://web.archive.org/web/2004040205185/http://www.w3.org/TR/ws-arch/.

"Annotation Engine," Berkman Center for Internet & Society at Harvard Law School, retrieved on Jan. 30, 2004 at <<http://cyber.law.harvard.edulproj ectsl annotate.html>>, 3 pages.

"Annotator Instructions," Berkman Center for Internet & Society at Harvard Law School retrieved on Jan. 30, 2004 at <<http://cyber.law.harvard.edu/annotate/instructions.html>>, also found at <<http://cyber.law.harvard.edu/cite/instructions.html>>, 1 page.

"Annotator Wishlist," Berkman Center for Internet & Society at Harvard Law School retrieved on Jan. 30, 2004 at <<http://cyber.law.harvard.edulcite/annotate.cgi ?ction=print&markup ;center=; view=http%3A%2F%2Fcy ...>>, 1 page.

Roscheisen et al., "Beyond Browsing: Shared Comments, SOAPs, Trails, and On-Line Communities," Computer Networks and ISDN Systems 27:739-749, 1995, 12 pages.

Canadian Office Action mailed Apr. 14, 2009 for Canadian Patent Application No. 2594573, a counterpart foreign application of U.S. Appl. No. 11/039,645, 3 pages.

Translated the Chinese Office Action mailed May 9, 2008 for Chinese Patent Application No. 200680002606.2, a counterpart foreign application of U.S. Appl. No. 11/039,645, 22 pages.

Translated the Chinese Second Office Action mailed Jun. 5, 2009 for Chinese Patent Application No. 200680002606.2, a counterpart foreign application of U.S. Appl. No. 11/039,645, 20 pages.

Translated the Chinese Third Office Action mailed Nov. 27, 2009 for Chinese Patent Application No. 200680002606.2, a counterpart foreign application of U.S. Appl. No. 11/039,645, 15 pages.

Carter et al., "Digital Graffiti: Public Annotation of Multimedia Content," Proceedings of the CHI2004, Vienna, Austria, Apr. 24-29, 2004, pp. 1207-1210.

Extended European Search Report mailed Dec. 22, 2009, issued in corresponding European Patent Application No. EP 06 71 8773.2, filed Jan. 18, 2006, 9 pages.

The European Office Action mailed Mar. 26, 2010 for European Patent Application No. 06718773.2, a counterpart foreign application of U.S. Appl. No. 11/039,645, 1 page.

Translated the Japanese Office Action mailed Jan. 25, 2011 for Japanese Patent Application No. 2007-552235, a counterpart foreign application of U.S. Appl. No. 11/039,645, 6 pages.

Non-Final Office Action for U.S. Appl. No. 11/537,518, mailed on Apr. 28, 2011, John Lattyak, "Acquisition of an Item Based on a Catalog Presentation of Items," 26 pages.

Office action for U.S. Appl. No. 11/763,357, mailed on May 26, 2011, Retzlaff, "Obtaining and Verifying Search Indices," 21 pages.

International Search Report mailed Sep. 9, 2008, in International Application No. PCT/US/08/64387, filed May 21, 2008, 1 page.

International Search Report mailed Aug. 15, 2008, in International Application No. PCT/US07/89105, filed Dec. 28, 2007, 2 pages.

International Search Report mailed Aug. 15, 2008, in corresponding International Application No. PCT/US08/57829, filed Mar. 21, 2008, 1 page.

International Search Report mailed Jul. 7, 2008, in International Application No. PCT/US08/57848, filed Mar. 31, 2008, 2 pages.

PCT International Search Report and the Written Opinion for Application No. PCT/US 08/64389, mailed on Jan. 28, 2009, 7 pages.

PCT International Search Report and the Written Opinion for Application No. PCT/US2006/001752, mailed on Jul. 27, 2006, 8 pages.

"Say NO to Third Voice," Worldzone.net, 1999-2004, retrieved on Jan. 30, 2004 at <<http://worldzone.netiinternetipixelsnttv/index.html>>, 3 pages.

Marshall, "The Future of Annotation in a Digital (Paper) World," Proceedings of the 35th Annual GSLIS Clinic, University of Illinois at Urbana Champaign, Urbana, 11, Mar. 22-24, 1998, pp. 1-19.

Kumar, "Third Voice Trails off . . . ," Wired News, 2004, retrieved on Jan. 30, 2004 at <<http://www.wired.com\news/printIO. 1294, 42803,00.html>>, 3 pages.

U.S. Appl. No. 11/277,894, filed Mar. 29, 2006, Jateen P. Parekh, Gregg E. Zehr, and Subram Narasimhan,"Reader Device Content Indexing".

Bradley, "Plastic Shape Shifter", retrieved on May 7, 2009 at <<http://www.reactivereports.com/61/61_3.html>>, Chemistry WebMagazine, Issue No. 61, Dec. 2006, 2 pgs.

Cavanaugh "EBooks and Accommodations", Teaching Expectional Children vol. 35 No. 2 p. 56-61 Copyright 2002 CEC, pp. 56-61.

Chi et al. "eBooks with Indexes that Reorganize Conceptually", CHI2004, Apr. 24-29, 2004, Vienna, Austria ACM 1-58113-703-6/04/0004, pp. 1223-1226.

Davison et al. "The Use of eBooks and Interactive Multimedia, as Alternative Forms of Technical Documentation" SIGDOC'05, Sep. 21-23, 2005, Conventry, United Kingdom, Copyright 2005 ACM 1-59593-175-9/5/0009, pp. 108-115.

Elspass, et al., "Portable Haptic Interface with Active Functional Design", In Proceedings SPIE Conference on Smart Structures and Integrated Systems, Newport Beach, California, vol. 3668, Mar. 1999, 926-932.

"Haptic History—Machine Haptics (Expansion)" retrieved on May 7, 2009 at <<http://hapticshistory.chc61.uci.cu/haptic/site/pages/Machine-Haptics-Became_5.php.>> from Google's cache, text-only version as webpage appeared on Apr. 16, 2009, 8 pgs.

Jones, et al., "Development of a Tactile Vest", IEEE Computer Society, In the Proceedings of the 12th International Symposium on Haptic Interfaces for Virtual Environment and Teleoperator Systems, Mar. 27-28, 2004, pp. 82-89.

Leutwyler, "Shape-shifting Polymer Gels", retrieved on May 7, 2009 at <<http://www.scientificamerican.com/article.cfm?id=shape-shifting-polymer-ge&print=true>>, Scientific American, Nov. 9, 2000, 1 pg.

Nakatani, et al., "3D Form Display with Shape Memory Alloy", In Proceedings of 13th International Conference on Artificial Reality and Teleexistence (ICAT), 2003, pp. 179-184.

"Shape Memory Polymer", retrieved on May 7, 2009 at <<http://en.wikipedia.org/wiki/Shape_Memory_Polymer>>, Wikipedia, 8 pgs.

Sohn et al. "Development of a Standard Format for eBooks", SAC2002, Madrid, Spain, 2002 ACM 1-58113-445-2/02/0, pp. 535-540.

Wellman, et al., "Mechanical Design and Control of a High-Bandwidth Shape Memory Alloy Tactile Display", Springer-Verlag, In the Proceedings of the International Symposium on Experimental Robotics, Barcelona, Spain, Jun. 1997, pp. 56-66, 12 pgs.

Yoshikawa, et al., "Vertical Drive Micro Actuator for Haptic Display Using Shape Memory Alloy Thin Film", IEE Japan, Papers of Technical Meeting on Micromachine and Sensor System, Journal Code L2898B, vol. MSS-05, No. 21-44, 2005, pp. 103-108.

Desmoulins et al., "Pattern-Based Annotations on E-books: From Personal to Shared Didactic Content", Proceedings of the IEEE International Workshop on Wireless and Mobile Techniques in Education, 2002, 4 pages.

Leach et al, "A Universally Unique IDentifier (UUID) URN Namespace", Jul. 2005, IETF, retrieved on Apr. 21, 2010 at http://tools.ietf.org/pdf/rfc4122.pdf, 32 pgs.

Cafesoft.com, "Security Glossary", dated Oct. 13, 2003, retrieved from the Wayback Machine on Jul. 2, 2009 at <<http://web.archive.org/web/20031013022218/http://cafesoft.com/support/security-glossary.html>>, 6 pages.

PCT Search Report from Application No. PCT/US08/57829, mailed on Aug. 15, 2008, 2 pages.

PCT Search Report from Application No. PCT/US08/64368, mailed on Sep. 22, 2008, 2 pages.

PCT Search Report from Application No. PCT/US07/89105, mailed on Aug. 18, 2008, 4 pages.

PCT Search Report from Application No. PCT/US08/57871, mailed on Nov. 3, 2008, 4 pages.

U.S. Appl. No. 11/763,314, filed Jun. 14, 2007, "Display Dependent Markup Language", John Lattyak, Steven K. Weiss.

* cited by examiner

```
<root version="2.0" defaultDiv="storefront" ttl="3600" cacheFile="storefront.xml" action="">    ← 314
  <menu-items>
    <menu-item name="ABC Store" div="storefront" link="storefront.xml" />    ← 316
    <menu-item name="Top Sellers" div="ts_0" link="topsellers.xml" />
    <menu-item name="New Arrivals" div="nr_0" link="newreleases.xml" />
    <menu-item name="Recommended For You" div="rec_0" link="recommendations.xml" />
    <menu-item name=""Save For Later" Items" div="wl_-dateadded_0" link="wishlist.xml" />
  </menu-items>
  <instructions>
    <div name="storefront" fetchUrl="storefront_b.xml">    ← 318
      <text x="0" y="0" >ABC Store</text>    ← 602                                              ← 612
      <rectangle x="0" y="720" fill="true" color="lightgray" width="600" height="80" />
      <text x="35" y="730" >visit us at www.abcstore.com</text>    ← 610
      <text x="35" y="78" width="400">Hello, John Smith</text>
      <text x="35" y="116">    ← 604
        <span size="-2">
          <b>Browse the Store</b>
        </span>
      </text>
      <text x="64" y="144">Books</text>
      <line x1="120" x2="583" y1="144" y2="144" dotted="true" />    ← 320
      <submit y="144" name="" divId="browse_154606011_-salesrank_0" url="browse_items.xml">
        <include name="nodeid" id="book" />
      </submit>
      <text x="64" y="176">Newspapers</text>
      <line x1="180" x2="583" y1="176" y2="176" dotted="true">

<!-- more -->

<text x="141" y="314" width="440" height="21" lineMargin="20">    ← 606
        The Purpose Drive Life: What on Earth Am I Here For?
      </text>
      <image x="50" y="294" width="70" height="100" url="http://images-website.com/274jpg" />
      <text x="141" y="358" width="440">
        <span size="-2">
          <i>Rick Warren</i>
        </span>
      </text>
      <submit y="400" name="" height="96" divId="id_B000FC2KG0" url="item_details.xml">    ← 322
        <include name="BookID" id="topSeller" />    ← 324
      </submit>
      <image x="141" y="368" url="http://images-website.com/275jpg" />    ← 608

<!-- more titles ..... -->

<hidden name="nodeid" id="book" value="154606011" />    ← 326
      <hidden name="nodeid" id="newspaper" value="165389011" />
      <hidden name="nodeid" id="rss" value="241647011" />
      <hidden name="nodeid" id="mag" value="241646011" />
      <hidden name="BookID" id="topSeller" value="B000FC2KG0" />
      <hidden name="BookID" id="newRelease" value="B000FC2QGF" />
      <hidden name="BookID" id="recommend" value="B000FCKERC" />
    </div>
    <div name="id_B000FC2KG0">
      <!-- book detail page -->
    </div>
  </instructions>
</root>
```

FIG. 6

DEVICE SPECIFIC PRESENTATION CONTROL FOR ELECTRONIC BOOK READER DEVICES

This application claims the benefit of U.S. Provisional Application No. 61/059,187, filed on Jun. 5, 2008.

BACKGROUND

Electronic distribution of information has gained importance with the proliferation of computing devices and has undergone a tremendous upsurge in popularity as the Internet has become widely available. With the widespread use of the Internet, it has become possible to distribute large, coherent units of information, such as books and magazines, using electronic technologies. Books distributed using electronic technologies are commonly referred to as electronic books ("eBooks"). Various entities make eBooks available for download over ordinary Internet connections, such as broadband and dialup connections.

One problem today is that digital content may be displayed and read on a variety of different computing devices (e.g., computer monitors, portable digital assistants (PDAs), pocket computers, specialized eBook reader devices, etc.), with a wide assortment of different display conditions (e.g., screen size and resolution, font type and size, margins, line spacing, etc.). Typically, digital content is structured as virtual frames presented on a computing device. In the context of the Internet, content is arranged and delivered as "web pages" that may be rendered on the computing device by a rendering program, such as a browser. Such web pages are created using a markup language that describes the structure of the content on the page, and provides instructions to the browser regarding how to render the content. HTML (Hypertext Markup Language) is the predominant markup language for the creation of web pages. Web pages can be designed with instructions to assist in the rendering of the content on different devices. But, since the display conditions vary widely, HTML simply attempts to render the content in the best way it can. In some cases, content flows off the bottom of the screen or to the right of the screen. This may not be a problem for a browser-enabled computer with a normal display, as the user can easily scroll to the off-screen content.

However, a growing number of devices are employing other types of displays, such electronic paper display technology. An electronic paper display is one that has a high resolution (150 dpi or better) and is bi-stable, meaning that it is capable of holding text or other rendered images even when very little or no power is supplied to the display. One exemplary electronic paper display that may be used is an E Ink-brand display. One shortcoming of such displays is a comparatively slow refresh rate. For such displays, scrolling to off-screen content may take an unacceptable amount of time from a user experience perspective.

Some dedicated eBook reader devices use such electronic paper displays. As a result, traditional approaches to providing digital content to client devices are proving to be less effective, or in some cases, entirely ineffective when delivering to eBook reader devices. Accordingly, there remains a need to improve the way digital content is delivered to and rendered on such eBook reader devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 6 illustrates excerpts of the markup language that defines the page rendered on the eBook reader device in FIG. 5.

DETAILED DESCRIPTION

This disclosure is directed to techniques for delivering digital content to be rendered on electronic devices, such as, for example, electronic book ("eBook") reader devices. Such devices have different technical features, particularly in terms of display and navigational capabilities. For instance, eBook reader devices may have differing screen sizes, use different types of display technologies (e.g. LCD, electronic paper display, etc.), and have a range of browser functionality. In one particular implementation described below, certain eBook reader devices do not possess full browser functionality to receive and render web pages written in html. Instead, digital content served to these devices is structured in pages that are written using a markup language that enables page designers to specify precise two-dimensional locations at which to position elements of the digital content onto a display with a particular screen configuration. The markup language specifies an x-coordinate and a y-coordinate for each content element so that the content element can be placed exactly on a unique pixel of a particular screen configuration. As such, the markup language is referred to as "xyml" as it includes instructions to identify "x" and "y" coordinates, and may also use tags, delimiters, instructions, and/or other features of a markup language.

Xyml content can be rendered on any display device, but is typically structured in "pages" that are tailored for presentation on a specific device having a known set of characteristics, such as screen size, screen orientation, screen resolution, display refresh rate, navigation inputs (e.g., touch screen, stylus, mouse, thumb-wheel, etc.), etc. In contrast to HTML content, xyml content can be presented on electronic paper displays, which because of their relatively slow refresh rates are not well suited to scrolling and reflowing of text.

As eBook reader devices gain popularity, however, there are likely to be devices designed in many different shapes, sizes, formats, and functionality. Thus, the techniques described in this disclosure provide ways of efficiently and effectively delivering content to various types of reader devices (and potentially other electronic devices), and to control presentation of that content on individual devices.

The techniques described herein may be implemented in a number of ways. Example implementations are provided below with reference to the following figures.

Example Architecture

Figure 1:
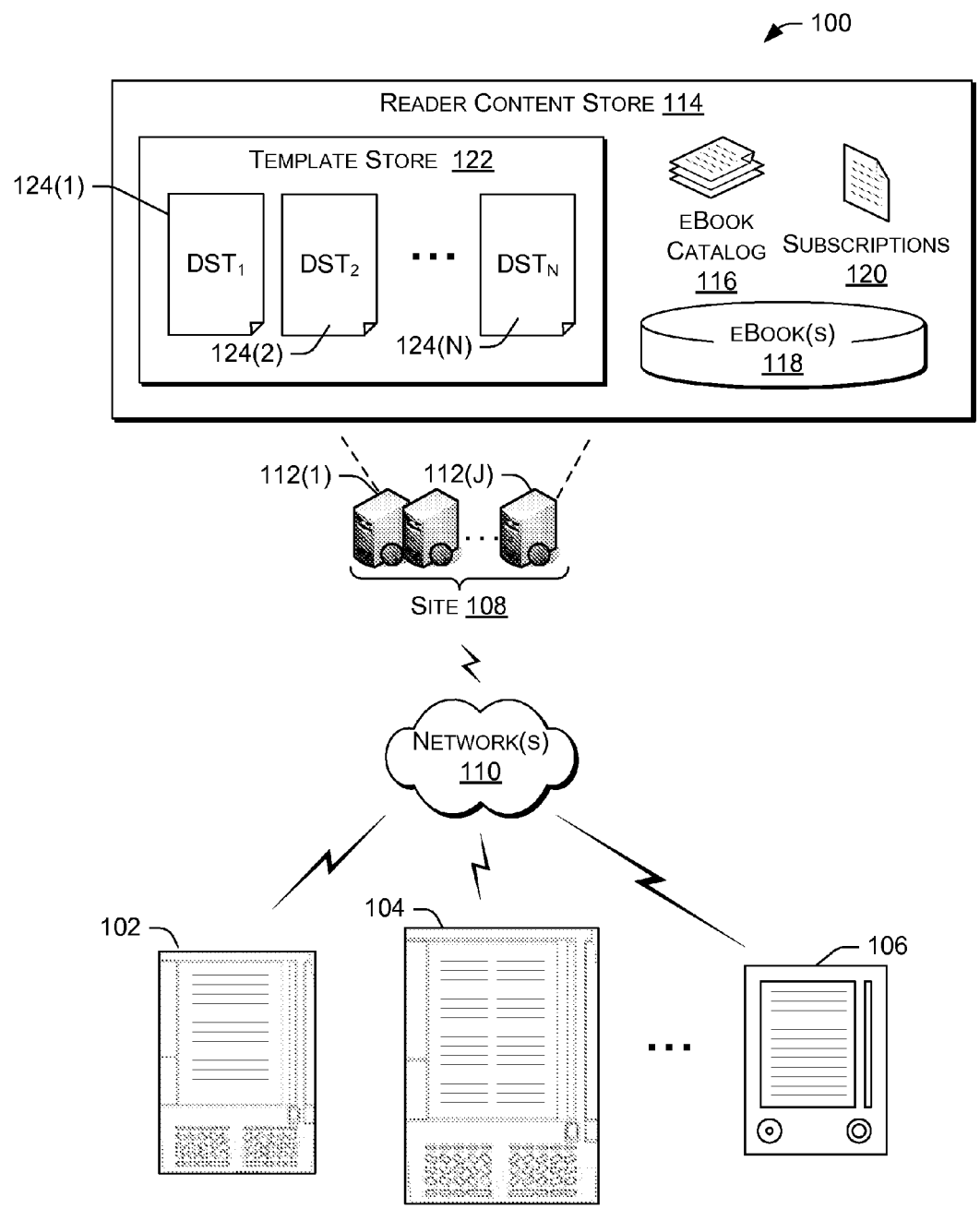
FIG. 1 illustrates an example architecture in which content is distributed by a reader content site to various kinds of electronic book reader devices based upon device configurations.

FIG. 1 illustrates an exemplary architecture 100 in which digital content is served upon request to eBook reader devices with different display characteristics. In architecture 100, representative eBook reader devices 102, 104, and 106 access a host site 108 via a network 110. The network 110 is representative of many different types of networks, such as cable networks, the Internet, local area networks, wide area networks and wireless networks, or a combination of such networks. It may include wire-based and/or wireless technologies. While in this example, the devices accessing the host site 108 are described as being eBook reader devices, in other implementations the architecture 100 can additionally or alternatively be configured to interact with and support other types of electronic device, such as PCs, PDAs, set-top-boxes, game consoles, and the like. In that case, at least some of these other types of devices may be capable of displaying html pages and/or extensible markup language (XML) pages.

Referring back to FIG. 1, the site 108 hosts a reader content store 114 that is accessible by the eBook reader devices 102-106 over the network 110. The site 108 is hosted on one or more servers 112(1), . . . , 112(J). Many different server architectures may be used to implement the site 108, including arranging the servers 112 as a server farm. The site 108 is capable of handling requests from the eBook reader devices 102-106 and serving, in response, various information and data. In certain implementations, the site 108 is representative of a website accessible over the Internet, while in other implementations the site 108 may be a proprietary site requiring permissions for access.

The representative eBook reader devices 102-106 possess different display and functionality capabilities. In FIG. 1, the first reader device 102 is representative of a handheld eBook reader device that employs an electronic paper display with limited browser functionality. The second reader device 104 illustrated in FIG. 1 is representative of a more feature-rich eBook reader device that employs a larger electronic paper display, and possesses greater browser functionality. The third reader device 106 is representative of another type of eBook reader device with a different display size and functionality feature set. Although only three devices are illustrated for discussion purposes, it is noted that other example implementations of reader devices may include portable computing devices (e.g., laptop computers, tablet computers, etc.), communication devices (e.g., cellular phones, smart phones, etc.), entertainment devices (e.g., television set-top boxes, game consoles, portable gaming devices, digital video recorders, etc.), and other electronic devices capable of rendering and depicting eBook content.

Users employ the devices 102-106 to access site 108 and request content from the content store 114. In one scenario, a device 102 sends a request (such as a uniform resource locator (URL) request) to the servers 112. Upon receiving the request, the servers 112 process the request and access a content store 114 to retrieve content that assists the user in navigating the store 114. The content store 114 maintains, or has access to, an electronic book catalog 116 that stores information about eBooks 118 and other readable content (such as electronic magazines, newspapers, periodicals, etc.) that may, for example, be provided as part of a subscription 120. The catalog may include information such as product descriptions, customer reviews, ratings, summaries, excerpts of text, or other information related to electronic books or other content available from the content store 114. When a user visits the content store 114, the servers 112 return a stream of markup language (e.g., xyml) that may be rendered as one or more pages of content to assist the user in shopping for the eBooks 118 and subscriptions 120, including review and purchase of such readable content.

Because the eBook reader devices 102-106 have differing display characteristics and may potentially have limited functional capabilities, the content store 114 maintains a template store 122 to hold collections of pre-configured templates 124(1), 124(2), . . . , and 124(N). Each template 124 is designed to layout content elements on a particular screen configuration of an associated eBook reader device 102-106. The screen configuration includes many characteristics including, for example, screen size, screen type, refresh rate, device type, manufacturer, and so forth. The association between templates 124 and corresponding screen configurations may be implemented through data structures in the template store 122, such as tables that associate a listing of templates with various types of devices and/or screen configurations.

The templates 124 define how content is to be arranged on the various displays. The templates 124 use the xyml markup language to specify an x-coordinate and a y-coordinate that precisely locates each content element on the display. Through use of different templates, essentially the same content may be arranged differently depending on the display. As illustrated in FIG. 1, each device 102, 104, and 106 has different display capabilities. Device 102 represents a device with more limited functionality that is capable of unidirectional (e.g., vertical) navigational control. Device 104 represents a device with a richer set of functionality, allowing bi-directional navigational control. Both devices 102 and 104 are limited, however, in that they accept only content written in the xyml markup language. By using xyml, the servers 112 specify how content is presented on the various devices 102 and 104. In this sense, the clients 102 and 104 exhibit a thin client model in which the clients need not run sophisticated browsers to render the pages. Rather, the servers 112 tell the clients precisely where to place the content on their screens. Use of the xyml markup language for the templates 124 is described below in more detail.

The third device 106 is representative of another device that is capable of rendering not only xyml-written content, but also conventional web pages crafted using traditional html and/or xml. In this example, the third device 106 may represent a portable computing device (e.g., a tablet laptop) that executes a full functioning browser and a book reading application. In this example, the servers 112 may serve content formatted according to the templates 124, or alternatively, deliver content as web pages written in html that is rendered by the browser on the device 106. In another example, one or more of the templates 124 may be configured to deliver at least some of the content in html.

To illustrate the use of templates 124(1)-(N), suppose a user visits the content store 114 at site 108. When the user navigates to the site 108, the user's device (e.g., device 102) submits a request for content from the content store 114. The request contains credentials that identify the device and other relevant information (e.g., browser version, firmware version, serial number, supported markup languages, number and type of user inputs, etc.). From these credentials, the servers 112 ascertain the capabilities of the device as well as any customer services associated with the device, such as preferred services, affiliate services, and subscriptions to newspapers and magazines. The servers 112 then process the request according to the customer services to create the content to be returned to the device. The servers 112 further select an appropriate template 124 from the template store 122 to format the content according to the device capabilities learned from the credentials in the client request. Once formatted, the servers 112 serve the pre-formatted content to the requesting device 102. The device 102 invokes a rendering engine to render the template-formatted content and allow the user to interact with the content.

In one implementation, the servers fully load the device-specific template with text and other content elements. In this case, the resulting template-based page can be delivered and immediately rendered on the device without any change. The device-specific template may include image locations that reference images that can be separately fetched and rendered on the device. Alternatively, in some instances, the template may include the actual images so that they can be delivered and immediately rendered on the device along with the other content elements.

In other implementations, the device may store or cache images or other content elements. In this scenario, the template-based page may include a link or pointer to the locally stored images so that the device may retrieve the images when rendering the template-based page. For example, some firmware versions may include locally stored images, banners, or other content elements, while other firmware versions may not. Based on the credentials contained in the request, the servers 112, may ascertain which firmware version is installed on a given reader devices, and may then either server images (if the installed firmware version lacks the images) or include pointers to the locally stored images (if the firmware version includes the images). The returned page may further include links that enable the device to navigate through the store, browse eBooks and other subscriptions in the catalog 116, and to checkout and purchase one or more items.

Additionally or alternatively, based on the credentials or other information contained in the request, the servers 112, may determine a number and/or type of user inputs (e.g., touch screen, thumb wheel, joy stick, etc.) available to the device, and may serve a page to the device which is conducive to navigation and interaction by the user inputs available to the device. For example, if a device has only a one-dimensional user input, the servers 112 may serve a page that has links presented along the dimension of the user interface for ease of selection.

Server System

Figure 2:
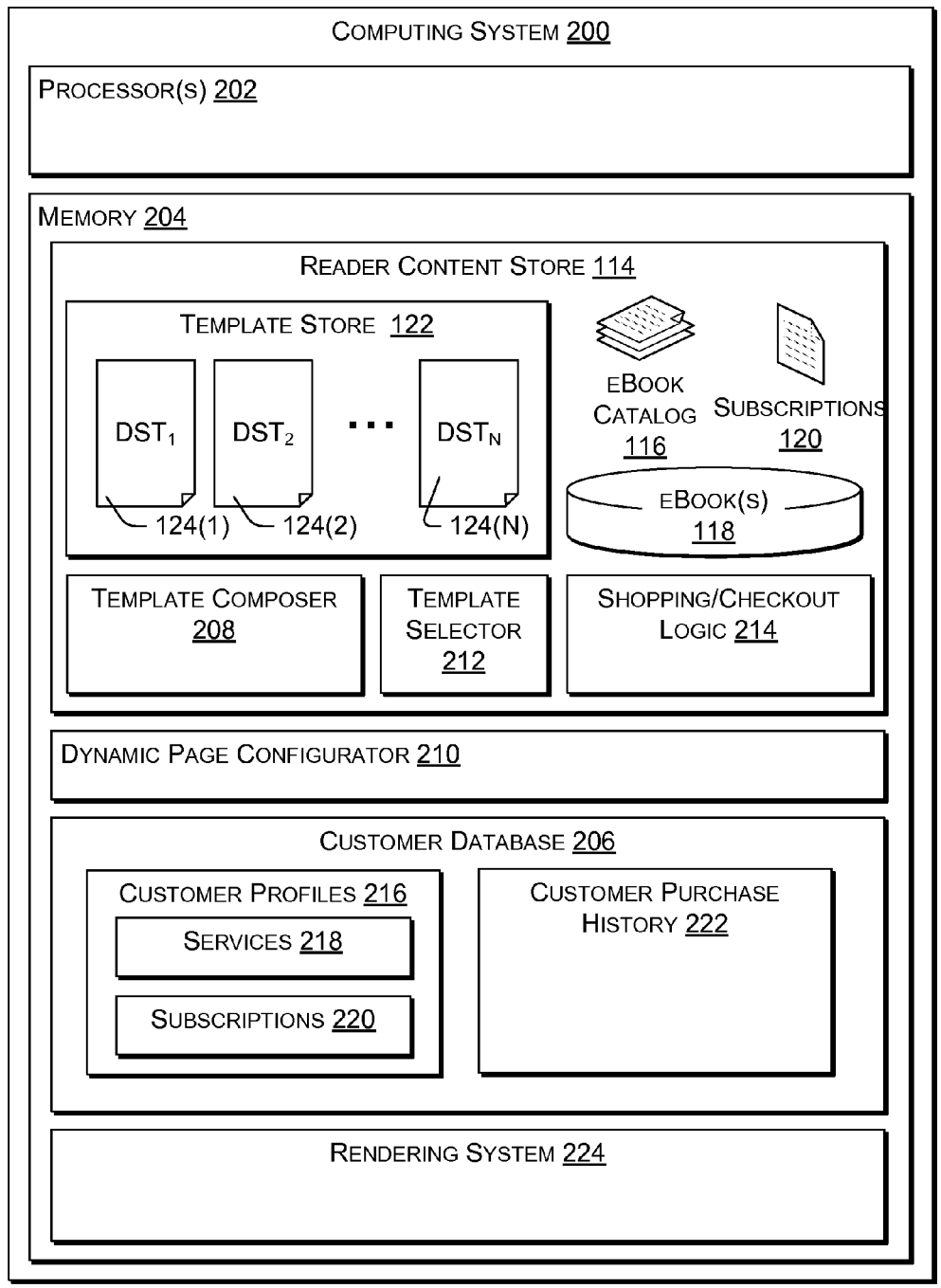
FIG. 2 is a block diagram of server(s) at a electronic reader content site, and illustrates selected modules implemented by the server(s) to serve content to book reader devices.

FIG. 2 is a block diagram schematically illustrating one example implementation of the reader content store 114 configured as a set of software modules installed on a computing system 200. The computing system 200 may consist of one or more computers (such as servers 112(1)-(J) in FIG. 1), and has processing capabilities and memory suitable to store and execute computer-executable instructions. Different modules of computing system 200 (e.g., reader content store 114, customer database 206, and rendering system 224) may reside on separate servers, common servers, or a hybrid of the two. In one example, a subset of servers 112 implement a template rendering system 224 that handles page-to-page transitions for individual reader devices. The reader devices contact this rendering system, and the rendering system, in turn, contacts the reader content store 114 and/or customer database 206 to gather needed data and/or perform the requested user action. In the illustrated example, the computing system 200 has one or more processors 202 and memory 204. The memory 204 may include volatile and nonvolatile memory, removable and non-removable media implemented in any type or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by an eBook reader or other computing device.

In the illustrated implementation, the reader content store 114 and a customer database 206 are all shown implemented as software or computer-executable instructions stored in the memory 204 and executable by the one or more processors 202. As mentioned above, The reader content store 114 includes eBook catalog 116 and the template store 122, as introduced above. Additionally, the reader content store 114 includes a template composer 208 with an dynamic page configurator 210, a template selector 212, and shopping/checkout logic 214. The shopping/checkout logic 214 processes requests received by the content store 114 from the various reader devices. When a request is received, the shopping/checkout logic 214 analyzes the request and determines what content should be delivered in return. In the context of the content store, the shopping/checkout logic 214 may represent a process flow that supports the user with one or more pages while browsing through various eBooks, magazines, newspapers, and other items to purchase. Various pages may used to enable user search and to present lists of items that resulted from the searches. When the user is ready to purchase an item, the process flow may sequence to a series of checkout pages that take the user through various steps, such as confirmation of the order, terms of payment, delivery options, and so forth.

While a shopping/checkout context is described, it is noted that this is merely illustrative for discussion purposes. In other contexts, different processing logic may be employed, where a different set of pages is used to guide users in a particular context scenario. For instance, suppose the user employs the reader device to conduct research at an online resource. In this context, the shopping/checkout logic 214 may represent a process flow that provides a series of pages to assist in identifying an excerpt or quote from an article or book.

The template composer 208 is used to compose the templates 124(1)-(N) maintained in template store 122. The templates 124 may be composed from scratch or by assembling one or more pre-made sub-templates. The templates 124(1)-(N) are designed to place the content in precise locations within the pages prescribed by shopping/checkout logic 214, prior to delivery to the eBook reader devices. The template composer 208 includes an dynamic page configurator 210 that enables designers to craft the templates 112 to place the content with precision by specifying two-dimensional coordinates using the display dependent markup language. The dynamic page configurator 210 can be used to dynamically select pre-made sub-templates to be composed into a template by the template composer 208. The template composer 208 queries the dynamic page configurator 210 to assemble a template and then populates the template with content elements to be displayed by a display device. The template also specifies two-dimensional coordinates at which to position the content elements for display on the particular display device. A more detailed discussion of the xyml markup language is provided below with reference to FIGS. 5 and 6.

The template selector 212 selects one or more templates 124 for use with the shopping/checkout logic 214. The selector 212 makes the selection based on the functionality of the requesting eBook reader device. There are many ways that the template selector 212 may use to determine the functionality of the requesting device. In one approach, the device submits credentials that indicate the screen size and configuration of the requesting device, as well as firmware version, browser version, compatible markup languages, and so forth. In another approach, the servers ascertain the device type from a serial number or other unique identifier and look up the functionality of the device.

In this manner, the templates 124 are used to dynamically create pages on demand. The templates are configured to place the content at precise locations for various screen configurations. In response to a request, a suitable template is selected and populated with content to form a page that may be served to the requesting device. These pages, when rendered on the devices, form a user interface that allow the user to navigate the content store 114, shop for eBooks and other items, and purchase those items.

As discussed above, in some implementations, templates may be selected and/or sub-templates may be composed into a template based at least in part on customer information. Additionally or alternatively, the content elements with which the template is populated may be based at least in part on customer information. Examples of customer information include, without limitation, purchase history, device usage history, geographic location, preference information, etc. For example, a template may be composed using a template composed in vertical rows base on a user's preference information indicating a preference for content presented in rows, based on a setting stored on the user's device, or the like. Also, for example, a template may be populated with a recommendation for a particular book based on a user's previous purchase of a book by the same author, based on a user's preference for a certain genre of book, or the like.

The architecture illustrated in FIG. 2 allows the design of the site to be decoupled from how the content is delivered to the various eBook reader devices. The site operators may design the process flow of shopping/checkout logic 214 to best service requesting users. Then, as various eBook reader devices with different functionality are introduced over time, templates may be created for each new device.

Figure 3:
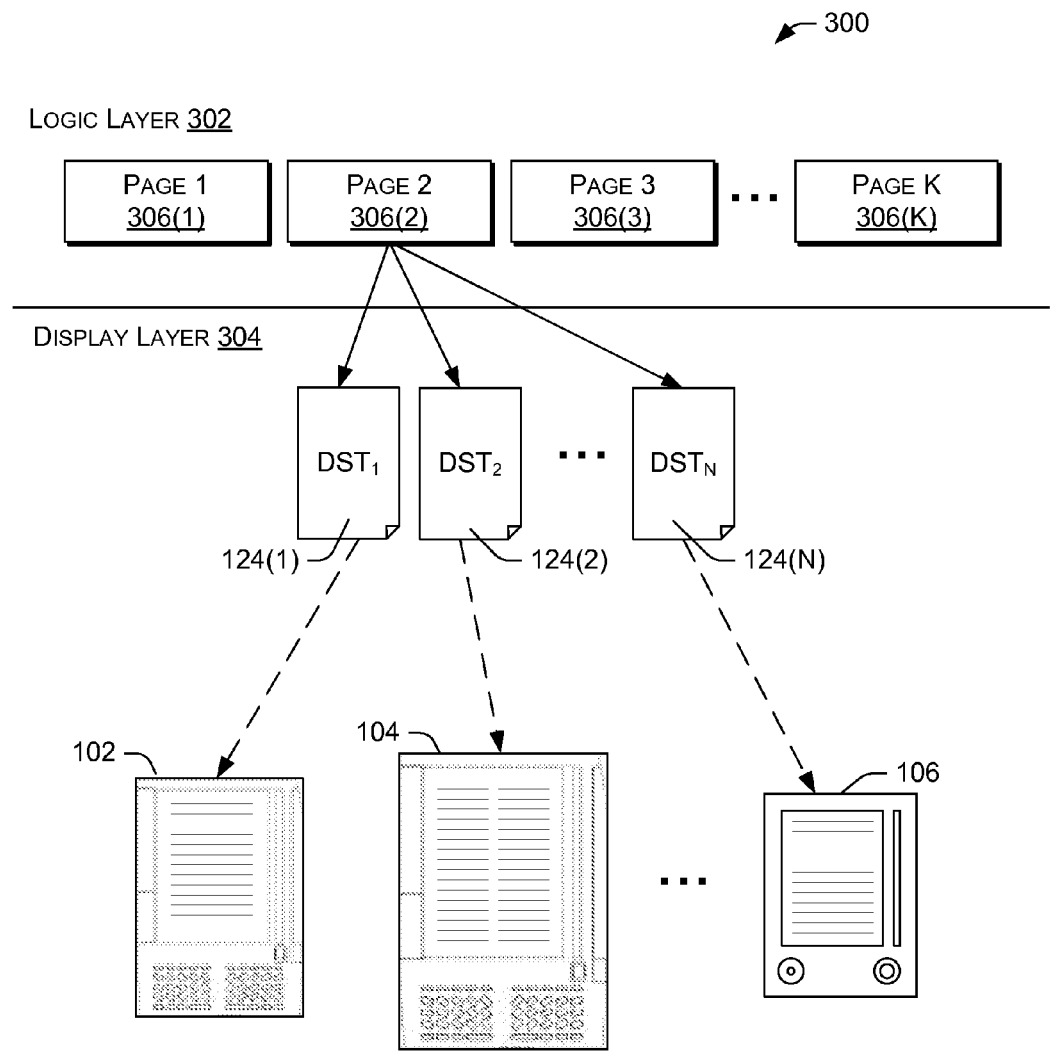
FIG. 3 is a hierarchical view of layered software components implemented by the server(s) of FIG. 2, including a logic layer and a display layer.

FIG. 3 illustrates this hierarchical architecture 300, where a logic layer 302 is separate from a display layer 304. At the logic layer 302, site operators may design process flow as a series of pages 306(1), 306(2), 306(3), . . . , 306(K). These pages represent content intended to be served to a user in response to various requests made by the reader devices when navigating the site 108. For example, in the context of an eBook store site, the pages 306 may represent a process flow that allows the user to browse for various eBooks, magazines, newspapers, and other items. The pages may include a search page to search for items and a results page to present results. The pages 306 may further facilitate a checkout process, where the user selects one or more items for purchase and proceeds to complete the purchase electronically.

At the display layer 304, the template designers may craft device-specific templates (DST) 124(1), 124(2), . . . , 124(N) for the various eBook reader devices introduced into the market. With this layered architecture, the content intended to be in a particular logic page 306 may be formatted according to a given device-specific template for the requesting device. In this example, suppose the servers intended to serve the content represented by page 306(2) at the logic layer 302. The content may be formatted according to any of the templates 124(1)-(N) at the display layer 304 depending upon which device requested the information. If the request came from the first reader device 102, the template selector chooses a template 124(1) that specifies how to layout the content of page 306(2) for the first reader device 102. If the request came from the second reader device 104, the template selector chooses a template 124(2) that specifies how to layout the content of page 306(2) for the second reader device 104. Finally, if the request originated from the third reader device 106, the template selector might elect a template 124(N) to format the content of page 306(2) and/or may elect to serve the page in html or xml.

With reference again to FIG. 2, the customer database 206 maintains information on users who have interacted with the site before and perhaps have purchased one or more items in the past. The customer database 206 stores customer profiles 216 containing user data such as names, shipping addresses, billing addresses, billing preferences, shipping preferences, demographical information, residency, citizenship, preferred currency, and so forth. The customer profiles 216 may include a link or association with the specific eBook reader device so that when the device submits a request, the customer profile may be accessed in the customer database.

The customer profiles 216 may also specify any special services 218 to which the user may be entitled. For instance, the user may be a repeat customer or preferred customer who has earned, or subscribed to, special services that might, for example, facilitate faster checkout, lower the cost of delivery, provide discounts, and so forth. The customer profiles 216 may further include a listing of any subscriptions 220 to which the user has subscribed. The customer database 206 may further track and retain a customer's purchase history 222 as individual users browse the store site and purchase items. The customer's purchase history 222 may track such data as pages visited, items reviewed, time spent reviewing items, what items were purchased, associations among items purchased, and so forth. This information may be used to provide more tailored service to the user, such as by recommending eBooks and other items of interest based on the user's past purchases. In some implementations, these customer profiles may be used to further customize templates for certain devices or device types.

Once the user purchases an item, that item may be delivered to the eBook reader device. In one implementation, the item is delivered wirelessly to the device. In another implementation, the device may be connected to a network to receive a download of the item over a wired connection.

Although all software modules are illustrated as residing on a common computing system 200, it is noted that the reader content store 114 may be maintained on a computing system independent of the customer database 206. In certain embodiments, the reader content store 114 and customer database 206 are maintained on separate computing systems that are interconnected through a network, such as a private network or a public network like the Internet. Moreover, one or more of the various modules of the content store 114 (i.e., eBook catalog 116, template store 122, template composer 208, template selector 212, and shopping/checkout logic 214) may be executed on different computing systems.

eBook Reader Device

Figure 4:
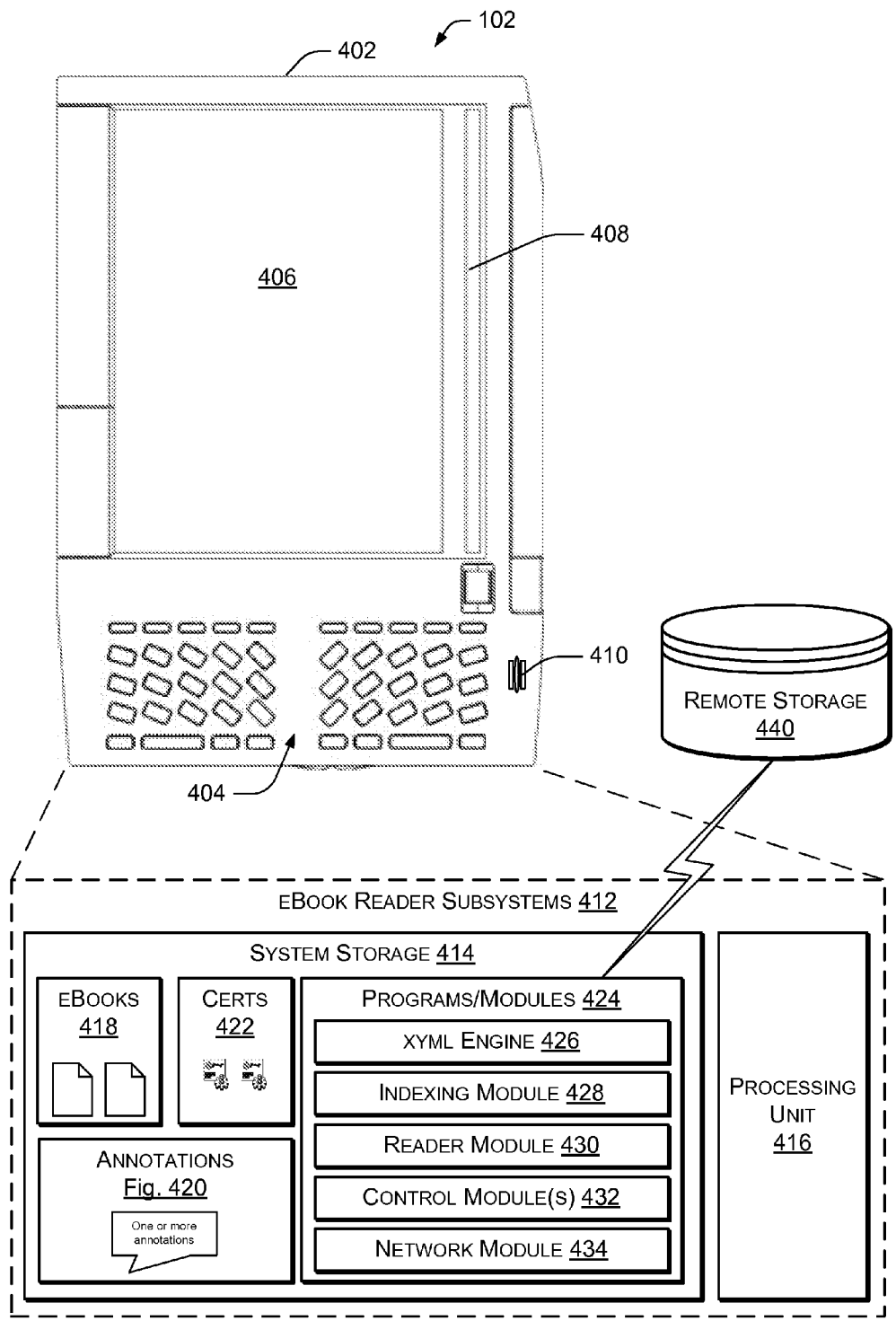
FIG. 4 is a block diagram showing various components of an illustrative handheld electronic book ("eBook") reader device.

FIG. 4 illustrates selected components from a representative eBook reader device, such as device 102 in FIG. 1. The eBook reader device allows users to read electronic content (e.g., text, graphics, multimedia, and the like), such as that found in electronic books, magazines, RSS feeds, newspapers, and the like. The electronic book reader device illustrated in FIG. 4 has a non-symmetric shape designed to approximate the feel of an open paperback book that is bound along its left side. As a human reader progresses through a physical paperback book, he or she may fold the read pages back around the bound spine and tuck them underneath the book. Overtime, the paperback book takes on a somewhat wedge-shaped configuration as more pages are folded back in this manner. Typically, the reader would grip the thicker part of the "wedge" in his or her left hand, and flip pages with his or her right hand.

The eBook reader device 102 has a body or housing 402, a keyboard 404, and a dual display system comprised of a first display 406 and a second display 408. The housing 402 may be formed of plastic, aluminum, or other suitable material. It may be textured or otherwise provided with tactile features to enhance gripping by a human user. Additionally, the housing may be of one-piece construction, or may be assembled from a plurality of sub-components or sub-portions.

The device keyboard 404 includes a plurality of keys. In the illustrated implementation, the keyboard includes at least 26 alphabet keys arranged in a QWERTY format as well as other function keys (such as space bar, control keys, function keys, and so forth). It is noted that the keyboard may include other arrangements of the 26 alphabet keys that do not conform to the QWERY layout. The keys are separated into two groups including a first or left-side group of keys and a second or right-side group of keys. The key groups are separated by a space or open region. Individual keys are sized to accommodate a user's thumb or finger. While the keys are arranged in horizontal rows, individual keys are rotated within the rows such that keys in adjacent rows lie along arcuate paths. The key orientation facilitates ergonomic operation by a user's thumbs when the user is grasping the two lower corners of the device 102.

The first display 406 in the dual display system presents content in a human-readable format to the user. The content presented in the first display 406 may take the form of electronic books, newspapers, or other readable or viewable materials. For example, the display 406 provides the text of the electronic books and also depicts any illustrations, tables, or graphic elements that might be contained in the electronic books. In one implementation, the content display 406 employs display technology with a relatively slow refresh rate in exchange for a relatively low rate of power consumption. This tradeoff serves to maximize battery life. Further, since the display 406 may be used to depict electronic books, the content is relatively static and hence a slow-refresh rate technology may be suitable for implementing the display 406. In some implementations, the display 406 is not responsive to user input.

As one example, the display 406 may be implemented using electronic paper display technology. In general, an electronic paper display is one that has a high resolution (150 dpi or better) and is bi-stable, meaning that it is capable of holding text or other rendered images even when very little or no power is supplied to the display. The electronic paper display technology may also exhibit high contrast substantially equal to that of print on paper. Some exemplary electronic paper displays that may be used with the implementations described herein include bi-stable LCDs, MEMS, cholesteric, pigmented electrophoretic, and others. One exemplary electronic paper display that may be used is an E Ink-brand display.

The second display 408 of the dual display system is a narrow screen located adjacent to the content display 406. The narrow display 408 is illustrated as being positioned to the right of the content display 406, although it may be located elsewhere in the housing 402 in other implementations. The narrow display screen 408 may be responsive to user input registered via, for example, a finger, a stylus, or other similar pointing device. Additionally, the narrow display screen 408 may enable presentation of graphic elements that correspond to content displayed in the content display 406. Some exemplary displays that may be used with the implementations of the narrow display include organic LEDs, TFT, and PN LCD.

The narrow display screen 408 provides many diverse functions. For instance, it may present a form of user interface that enables the user to command the device to turn pages of text, scroll up or down pages of text, zoom in or zoom out, navigate to other locations in the book, or the like. In possible implementations, the narrow display 408 may be broken into segments or zones, with different ones of the segments or zones corresponding to user input in different ways. For example, the user might tap one part of the narrow display 408 to scroll in one direction, and may tap another part of the narrow display 408 to scroll in another direction.

The eBook reader device 102 may be further equipped with a page turner to facilitate the turning of pages of an electronic book. The page turner is configured to simulate a tactile riffle feel as the user flips pages in a book. In the illustrated implementation, the page turner is configured as a page turning mechanism 410 having a tactile member (e.g., a ridge or indentation) juxtaposed with one or more sensors, and sized to accommodate a user's thumb or finger. The tactile member provides the tactile feedback to the user to simulate the riffle sensation. The sensors detect speed and direction of the user's thumb or finger, thereby enabling the device to detect gestures of flipping forward or backward through one or more pages of the book. While illustrated to the right of the keyboard 404, the page turning mechanism 410 may be located in any number of locations on the device 102. Further, pages may be turned using other controls, such as keys in the keyboard 404, or soft keys depicted on one or both of the displays.

The eBook reader device 102 has various internal components, which are referred to generally as eBook reader subsystems 412. In one implementation, the subsystems 412 include system storage 414 and a processing unit 416. The processing unit 416 interacts with the system storage 414 to facilitate operation of the eBook reader device 102. The system storage 414 may be used to store one or more eBooks 418, annotations 420, authentication certificates 422, and other content, as well as software programs or other executable modules 424 which may be executed by the processing unit 416. Examples of such programs or modules 424 include an xyml engine 426 for rendering pages created using the xyml markup language, an indexing module 428 for indexing eBooks with invariant location reference identifiers, a reader module 430, one or more control modules 432 (e.g., power management), network connection module 434 to implement an interface to a network (e.g., wireless network), as well as various other modules which are not shown, such as operating models, display drivers, sensor algorithms, page turn detectors, and the like.

The xyml engine 426 parses the xyml markup language to render the content elements on the large display 406. One notable feature of the rendering process is that, due to the nature of the xyml markup language, the xyml engine 426 may execute the instructions out of order. It does not need to execute the instructions in order in the way a browser conventionally executes html. For instance, in one implementation, the xyml engine 426 first renders text elements and other non-image elements. Then, the xyml engine 426 renders all image elements. In one approach, the xyml engine 426 utilizes one thread per image to request the image to be downloaded for the page. Once all of the images have been retrieved, a screen update is performed to draw all of the images on the display at the same time, thereby adding the images to the non-image elements already on the display.

In addition to the system storage 414, the eBook reader device 102 may have access to one or more sources of remote storage 440 over a network or on a peer-to-peer basis. The sources of remote storage 440 may be accessible using a network connection module, for example, and may be in communication via a wired or wireless connection. The remote storage 440 may include a personal computer, another eBook reader, or any other suitable remote storage device.

The system storage 414 and remote storage 440 may include volatile memory (such as RAM), nonvolatile memory, removable memory, and/or non-removable memory, implemented in any method or technology for storage of information, such as computer-readable instructions, data structures, program modules, or other data. Also, the processing unit 416 may include onboard memory in addition to or instead of the system storage 414. Some examples of storage media which may be included in the system storage 414 and/or processing unit 416 include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the eBook reader device 102. Any such computer storage media may be part of the eBook reader device 102.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various implementations. An implementation of these modules and techniques may be stored on or transmitted across some form of computer-readable media.

Xyml Markup Language

Figure 5:
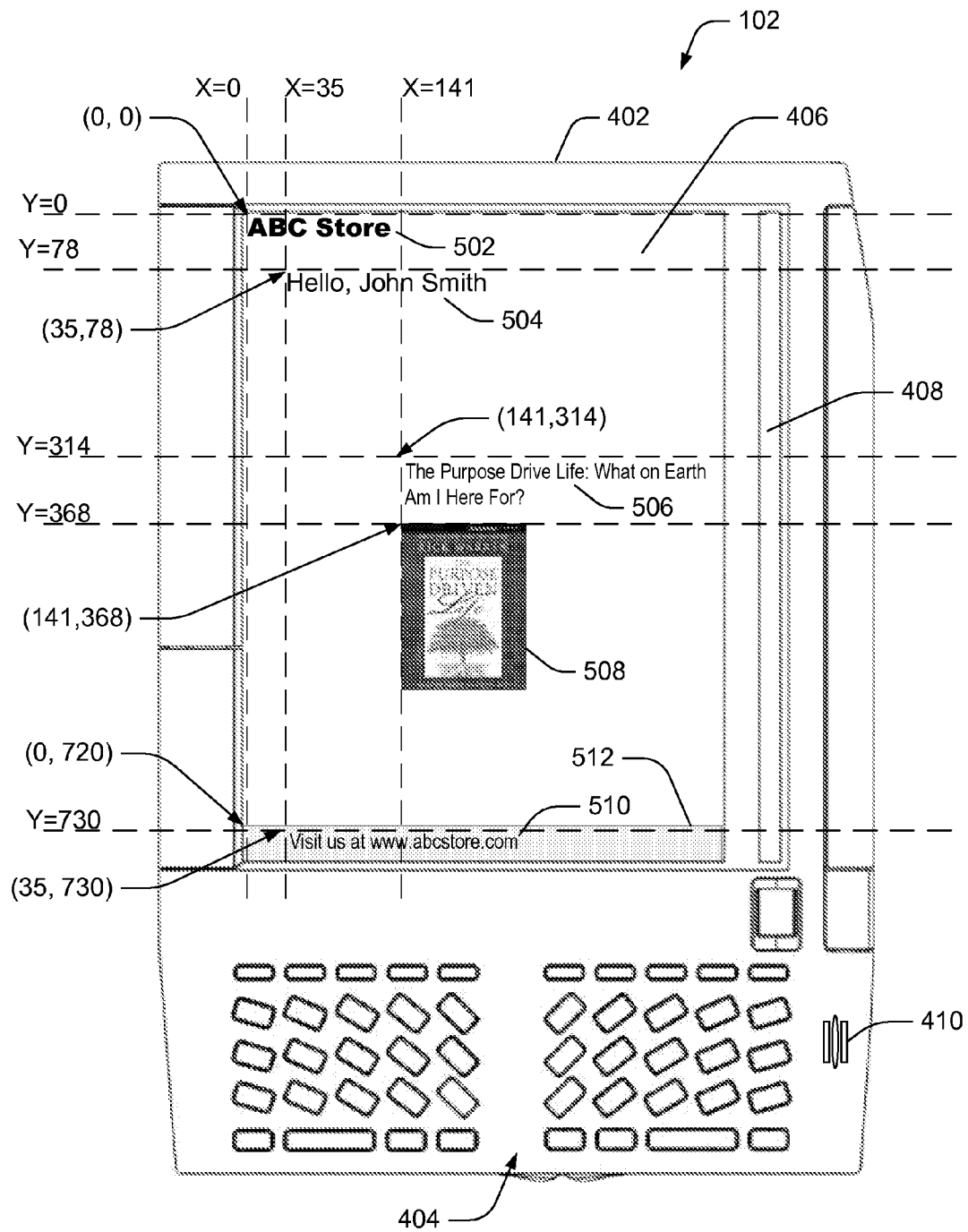
FIG. 5 is a front plan view of the eBook reader device of FIG. 4, with a page depicted on the device's display.

As discussed above, the xyml markup language enables template designers to designate precise locations of the content elements for a given display type. In this manner, the reader devices do not need to run browsers or other html layout engines to layout how and where the content elements are positioned on the display. Instead, the client devices merely parse the xyml code and place the elements at the locations prescribed by the xyml instructions in the pages designed for the client displays. To further illustrate these concepts, FIGS. 5 and 6 show how content elements are positioned on a particular screen configuration according to the underlying xyml markup language. FIG. 5 shows the eBook reader device 102 rendering a page with multiple content elements. The page was created by selecting a template and populating the template with the content prescribed by the shopping/checkout logic 214. The source of the markup language in the resulting page is illustrated in FIG. 6.

A page is rendered on the content display 406. The term "page", when applied in the context of the eBook reader device 102, refers to a collection of content that is presented at one time in the first display 406. Thus, a "page" may be understood as a virtual frame of the content, or a visual display window presenting the content to the user. Thus, pages are not fixed permanently, in contrast to the pages of published "hard" books. Instead, pages may be redefined or repaginated when, for example, the user chooses a different font for displaying the content in the first display 406.

The illustrated page in FIG. 5 includes six content elements: a text logo "ABC Store" 502, a text greeting "Hello, John Smith" 504, a text book title 506 ("The Purpose Driven Life What on Earth Am I Here For?"), a book cover image 508, a text invitation 510 ("visit us at www.abcstore.com"), and a light gray rectangle 512. Also shown are horizontal and vertical dashed lines to represent certain rows and columns of pixels in the eBook display. In this example, the pixel rows are enumerated 0, 1, 2, . . . , and R from left to right and the pixel columns are enumerated 0, 1, 2, . . . , and C from top to bottom, thereby placing the location (0, 0) at the upper left corner of the display. As one example, the content display 406 is 600× 800.

The text logo "ABC Store" 502 is positioned at the pixel specified by two-dimensional coordinates (0, 0) having an x-coordinate of zero (x=0) and a y-coordinate of zero (y=0). More specifically, the upper left corner of the logo image 502 is placed on the pixel location (0, 0). Similarly, the upper left corner of text greeting "Hello, John Smith" 504 is placed precisely at the pixel specified by the coordinates (35, 78). The text book title 506 is positioned at the pixel designated by the coordinates (141, 314) and the book cover image 508 is arranged at the coordinates (141, 368). Lastly, in this example, a text invitation "visit us at www.abcstore.com" 510 is positioned at the coordinates (35, 730) and a light gray rectangle 512 is drawn with the upper left corner placed at the coordinates (0, 720).

FIG. 6 shows the underlying xyml source 600 that produces the presentation layout shown in FIG. 5. The source 600 has a series of instructions defined by pairs of delimiters that are denoted as less-than symbols "<" and greater-than symbols ">". Some delimiters identify content elements to be presented on a display. For instance, the text element "ABC Store" is defined by an instruction 602 contained within delimiter pair.

Certain instructions specify location information for placement of content elements within a two-dimensional space. In one implementation, the location information is specified in instructions adhering to a syntax or format as follows:

<type x="x pixel value" y="y pixel value" content_element/> where "<" and "/>" are the delimiters of the instruction, "type" represents a type of content element (e.g., image, text, shape, etc.), "x=" sets an x-coordinate, "y=" sets a y-coordinate, "x pixel value" is a number for the x-coordinate, "y pixel value" is a number for the y-coordinate, and "content_element" is the content element to be positioned.

As an example, an instruction 604 specifies that the text greeting "Hello, John Smith" is to be positioned at the coordinates (35, 78), as seen by the instruction components x="35" and y="78". Notice, in FIG. 5, the greeting 504 is rendered at the location (35, 78) according to this instruction. As another example, an instruction 606 specifies that the title, "The Purpose Drive Life: What on Earth Am I Here For?" is to be positioned at the coordinates (141, 314), as seen by the instruction components x="141" and y="314". Again, in FIG. 5, the title 506 is rendered with its upper left corner beginning at the pixel location (141, 314). Similarly, an instruction 608 specifies that the book cover image is to be positioned at the coordinates (141, 368), as seen by the instruction components x="141" and y="368". As a result, the upper left corner of the book cover image 508 in FIG. 5 is positioned at pixel location (141, 368).

One notable aspect of the xyml source code is that, unlike html, instructions do not need to be written in a left-to-right, top-down manner in correlation with how the elements will eventually be arranged when rendered on the display. Instead, the content elements can be described anywhere in the document. As one example, an instruction 610 is provided to write the text string "visit us at www.abcstore.com" at a pixel location (35, 730). In FIG. 5, this text invitation 510 is shown at the lower left portion of the display 406. Notice, in the xyml code 600 of FIG. 6, that the instruction 610 follows the opening text instruction 602 to write the logo "ABC store" at the pixel location (0, 0) at the top left portion of the screen, but comes before the instruction 604 to write the text greeting "Hello, John Smith" at the pixel location (35, 78). Thus, the order of the instructions in the xyml code 600 does not correlate with the arrangement on the display because even though instruction 610 is before instruction 604, the corresponding element "visit us at www.abcstore.com" is positioned below the greeting "Hello, John Smith" on the display 406. This advantageous feature of the xyml code is achieved because the x and y coordinates are stipulated as part of the instruction.

Moreover, the xyml engine may parse the instructions and render content elements in separate passes. For example, in one implementation, the xyml engine first processes and renders non-image elements on the display, and then subsequently processes and renders the image elements.

Further, the relative depth of content elements on a page, known as "z order", is implied in the instructions of the xyml code. To illustrate this point, an instruction 612 in FIG. 6 directs the drawing of a rectangle having its upper left corner positioned at the pixel location (0, 720). According to the attributes in the instruction, the rectangle has a light gray fill and dimensions of 80 pixels in height by 600 pixels in width. As shown in FIG. 5, the light gray rectangle 512 is drawn at the bottom of the display screen 406. With reference again to FIG. 6, the text instruction 610 positions the text string "visit us at www.abcstore.com" at a location (35, 730) that resides within the rectangle. Since the text instruction 610 follows the rectangle instruction 612, the z order implied in this sequence is that the rectangle is drawn first and the text invitation is written over the rectangle. This is shown in FIG. 5, where the rectangle 512 resides behind the text invitation 510 to convey a relative depth of the two content elements.

The xyml markup language is particularly well suited for pages designed for devices in which the display refresh rates are comparatively slow, such as electronic paper displays. For instance, as just noted, a page written in xyml markup language does not need to be executed in a particular order (as a conventional browser might execute html) because the layout is defined before the page is served. In certain implementations, text elements and other non-image elements can be rendered first on the display, followed subsequently by the rendering of image elements. The image elements may be served with the content from the server, or alternatively, stored locally on the eBook reader device and retrieved when rendering the page. Further, more than one page may be provided in batch to the devices to allow a user to navigate through multiple pages before seeking new pages. The next batch of pages may be fetched automatically in advance of the user requesting the pages. In this way, any latency of downloading the content to the client device can be masked by the pre-fetching of additional content based on what the user is likely to request next.

The xyml markup language is described in more detail in U.S. patent application Ser. No. 11/763,314, entitled, "Device Dependent Markup Language," which was filed Jun. 14, 2007, which is hereby incorporated in full by reference.

Process Scenario

Figure 7:
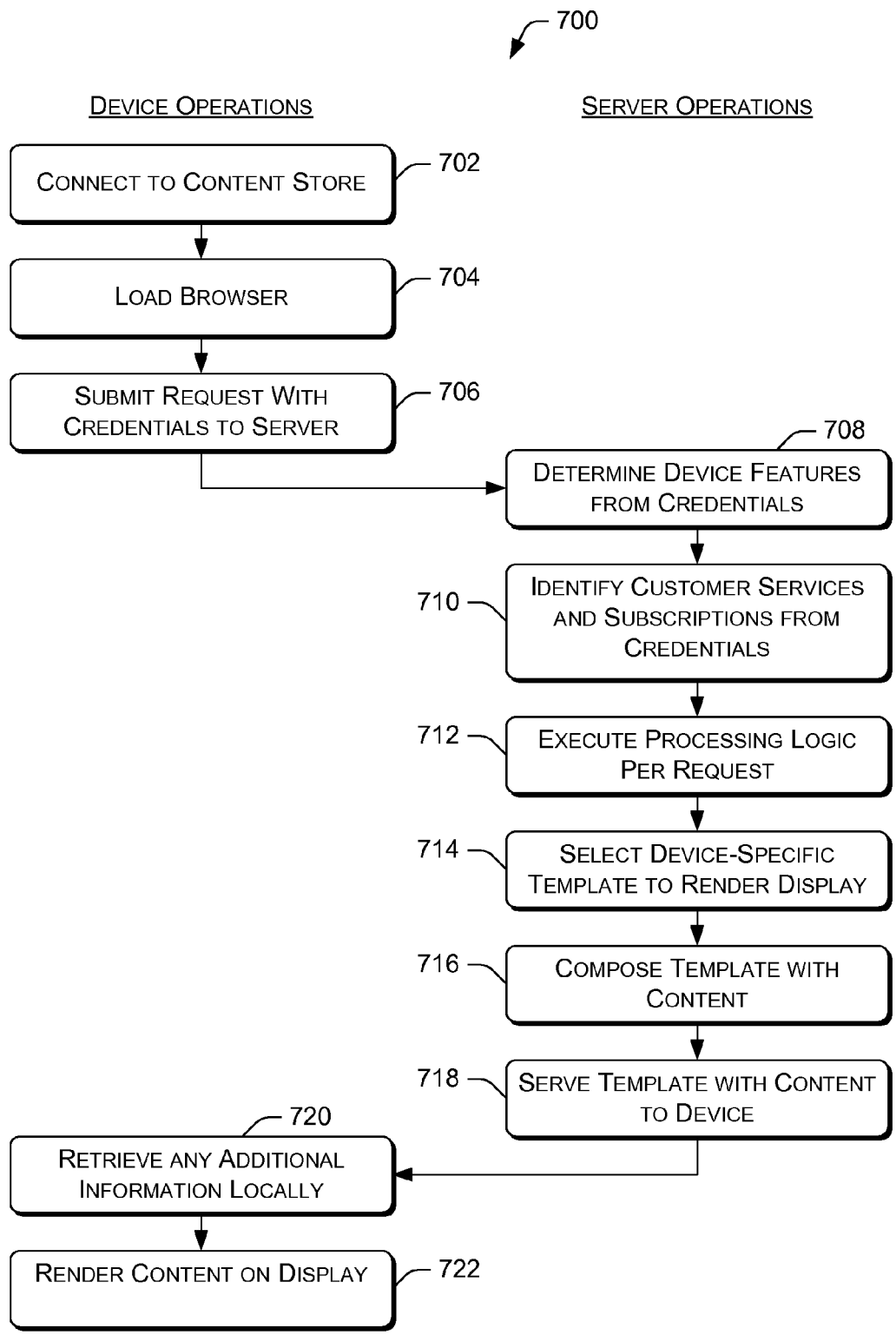
FIG. 7 is a flow diagram of a process for controlling presentation of content on various kinds of eBook reader devices.

FIG. 7 shows a process 700 for controlling presentation of content on various kinds of eBook reader devices. Each process is illustrated as a collection of referenced acts arranged in a logical flow graph, which represent a sequence that can be implemented in hardware, software, or a combination thereof. In the context of software, the acts represent computer-executable instructions that, when executed by one or more processors, perform the recited operations. Generally, computer-executable instructions include routines, programs, objects, components, data structures, and the like that perform particular functions or implement particular abstract data types. The order in which the acts are described is not intended to be construed as a limitation, and any number of the described acts can be combined in any order and/or in parallel to implement the process.

For discussion purposes, the processes are described with reference to the exemplary architecture 100 of FIG. 1. The operations in process 700 are illustrated diagrammatically under headings "device operations" and "server operations" to show generally, in one implementation, which operations are performed by which devices.

At 702, the eBook reader device 102 connects to the site 108 to visit the content store 114. In some implementations, the reader device is configured with wireless transceiver to connect to the site 108 over a wireless link. The device may be configured to communicate with the particular site in response to a specific user action, or in background as part of a routine connection process (such as when downloading subscription materials).

At 704, the browser (e.g., an xyml browser) is loaded into the reader device. In some implementations, the browser is loaded onto the device from the servers 112. In other implementations, the browser is resident on the device and is executed when the device connects to the content store 114. Additionally or alternatively, the device may be a full functioning device (e.g., device 106 in FIG. 1) that is capable of executing a regular html browser. In this case, the device may navigate to the site 108 and interact with the store 114 using the html browser. At 706, the eBook reader device submits a request to the store 114. The request contains credentials that identify one or more aspects of the device, such as a serial number, firmware version, screen configuration, screen size, and so on.

At 708, the servers 112 receive the request from the device 102 and determine the device's technical features from the information in the credentials. In one implementation, the device's technical features may be ascertained directly from data found in the credentials. Alternatively, the credentials may provide an identifier of the device which may be used to lookup the device's technical features in a database maintained at the store 114. For instance, the credentials may simply include a device serial number and a firmware version, and the servers 112 may use this information to learn the screen configuration, the processing capabilities, the browser functionality, and so forth.

At 710, the servers 112 may optionally use information from the credentials to ascertain certain data about the customer. The credentials may include data pertaining to the customer, or alternatively, simply contain an identity of a particular eBook reader device, which is associated with a particular customer. The device identity can thus be used to lookup the customer's account information to provide a higher level of support to that customer. For instance, the content store 114 may learn that the customer is a loyal or preferred customer, or that the customer has signed up for special services or subscriptions.

At 712, the servers 112 execute shopping/checkout logic 214 to process the request from the device. The request may include, or be embodied as, a url (universal resource locator) that dictates the step in the process flow at which the logic is to execute. The shopping/checkout logic 214 processes the request based on this location in the process flow as well as any special customer services learned from the customer account. As shown in FIG. 3, for example, the logic layer defines the process flow of an experience at the content store. Depending upon where the user is in the process, the server prepares to serve the appropriate content to the requesting device.

At 714, an appropriate device-specific template is selected according to the device features determined in act 708. In the implementation illustrated in FIG. 2, the template selector 212 uses information about the device to choose the correct template 124 from the template store 122.

At 716, the template 124 is populated with the content produced from processing the request to produce a page that can be served to and rendered on the eBook reader device. In one implementation, the servers 112 determine whether any images to be used in the rendered page are stored in the device. If so, the servers 112 add pointers to the images so that the xyml engine on the device can retrieve and render the locally stored images. Otherwise, the servers 112 add pointers to remote images (or in some instances the images themselves) to the template along with the text and other content elements.

At 718, the servers 112 deliver the page created from filling the device-specific template with appropriate content. At 720, the eBook reader device receives the page and determines whether any images or other content elements are to be pulled from local storage. If so, those images are added to the template-based page.

At 722, the device renders the page on the display. Since the page was created using the template specifically designed for that display, the content is properly laid out on the screen.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    receiving a request for content from an electronic device;
    determining, from technical feature information contained in the request, at least one technical feature of the electronic device, wherein the technical feature information comprises a markup language supported by the electronic device;
    ascertaining whether any one or more services are associated with the electronic device based on a profile of a user of the electronic device, wherein at least one of the one or more services being other than a subscription service;
    processing the request according to the one or more services to generate content to be served to the electronic device;
    selecting, using one or more processors, a template that is specific to the electronic device;
    populating the template with the content to generate at least one page; and
    serving the page to the electronic device for rendering.

2. A method as recited in claim 1, wherein the technical feature information further comprises at least one of a screen configuration or a firmware version of the electronic device.

3. A method as recited in claim 1, wherein the template is crafted using the markup language that specifies two-dimensional coordinates of pixel locations at which to position one or more elements of the content.

4. A method as recited in claim 1, wherein the content comprises at least one element stored locally on the electronic device, and the populating comprises filling the template with a reference to the element stored locally on the electronic device.

5. A method of handling a request from an electronic device, comprising:
    determining, from screen configuration information contained in the request, a screen configuration of the electronic device;
    ascertaining whether any one or more services are associated with the electronic device based on a profile of a user of the electronic device, wherein at least one of the one or more services being other than a subscription service;
    processing the request according to the one or more services to generate content to be served to the electronic device;
    selecting, using one or more processing devices, a device-specific template from a set of templates based, at least in part, on the screen configuration; and
    populating the device-specific template with the content to be served in response to the request, wherein the content comprises at least one element stored locally on the electronic device, and the populating comprises filling the template with a reference to the element stored locally on the electronic device.

6. A method as recited in claim 5, further comprising determining, from the request, a firmware version installed on the electronic device, and wherein the selection of the device-specific template is based at least in part on the determined firmware version.

7. A method as recited in claim 5, further comprising determining, from the request, a markup language renderable by a display of the electronic device, and wherein the selection of the device-specific template is based at least in part on the determined markup language.

8. A method as recited in claim 5, wherein determining the screen configuration comprises ascertaining one of a screen size or a screen type.

9. A method as recited in claim 5, wherein the device-specific template is written using a markup language that defines a layout structure of content elements when depicted on a display of the electronic device, the markup language specifying pixel locations at which to position the content elements on the display.

10. A server computing system comprising:
    one or more processors;
    memory accessible by the one or more processors;
    a collection of device-specific templates stored in the memory, the device-specific templates being associated with different types of electronic devices such that individual device-specific templates define layout structures of content elements when depicted on displays of the electronic devices;
    a template selector, executable by the one or more processors, to select a particular device-specific template for use in generating pages to be served to one of the electronic devices; and
    logic, executable by the one or more processors, to ascertain whether any one or more services are associated with the electronic device based on a profile of a user of the electronic device, wherein at least one of the one or more services being other than a subscription service, the logic further to ascertain technical feature information contained in a received request, wherein the technical feature information comprises a markup language supported by the electronic device.

11. A server computing system as recited in claim 10, wherein one or more of the templates are written in the markup language that specifies pixel locations at which to position the content elements on a display of the electronic device.

12. A server computing system as recited in claim 10, wherein the template selector chooses the particular device-specific template based on a configuration of a display of the electronic device.

13. A server computing system as recited in claim 10, wherein the template selector chooses the particular device-specific template based on a unique identifier of the electronic device.

14. A server computing system as recited in claim 10, wherein the template selector chooses the particular device-specific template based on a type of the electronic device.

15. A server computing system as recited in claim 10, wherein the template selector chooses the particular device-specific template based on a firmware version installed on the electronic device.

16. A server computing system as recited in claim 10, wherein the template selector chooses the particular device-specific template based a markup language renderable by a display of the electronic device.

17. A server computing system as recited in claim 10, further comprising logic to populate the device-specific template selected by the template selector with content elements associated with the service to generate the pages to be served to the electronic device.

18. One or more computer-readable media storing computer-executable instructions that, when executed by one or more processors, perform acts comprising:
  receiving requests from different types of reader devices;
  selecting, using the one or more processors, a template, from among multiple templates, to format content to be rendered on a display of a reader device, the selecting being based upon the type of reader device from which each request is received and on screen attributes of the reader device from screen attributes information contained in each request received;
  ascertaining whether any one or more services are associated with the reader device based on a profile of a user of the reader device, wherein at least one of the one or more services being other than a subscription service; and
  processing the request according to the one or more services to generate content to be served to the reader device.

19. One or more computer-readable media as recited in claim 18, wherein the requests contain credentials, individual credentials having data pertaining to the reader devices.

20. One or more computer-readable media as recited in claim 18, wherein the requests contain credentials, individual credentials having data pertaining to users of the reader devices.

21. One or more computer-readable media as recited in claim 18, wherein one or more of the templates are written in a markup language that specifies pixel locations at which to position content elements on the display of the reader device.

22. One or more computer-readable media as recited in claim 21, wherein one or more of the templates are written in a hypertext markup language or an extensible markup language.

23. One or more computer-readable media as recited in claim 18, wherein the requests contain credentials, individual credentials identifying a firmware version installed on the reader devices.

24. One or more computer-readable media as recited in claim 18, further comprising computer-executable instructions that, when executed, perform additional acts of populating the template with the content to generate one or more pages and serving the pages to the reader device.

25. One or more computer-readable media as recited in claim 18, wherein the selection is further based on a user input mechanism of the reader device.

26. The method of claim 1, wherein the electronic device is an eBook reader device.

27. The method of claim 5, wherein the electronic device is an eBook reader device.

\* \* \* \* \*